(12) United States Patent
Kakuya et al.

(10) Patent No.: US 7,367,310 B2
(45) Date of Patent: May 6, 2008

(54) CONTROLLER FOR COMPRESSION IGNITION ENGINE

(75) Inventors: Hiromu Kakuya, Hitachi (JP); Shiro Yamaoka, Hitachi (JP); Kengo Kumano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/657,054

(22) Filed: Jan. 24, 2007

(65) Prior Publication Data

US 2007/0215095 A1    Sep. 20, 2007

(30) Foreign Application Priority Data

Mar. 15, 2006    (JP) .............................. 2006-070140

(51) Int. Cl.
F02B 17/00    (2006.01)
F02P 5/00    (2006.01)

(52) U.S. Cl. .................................. 123/295; 123/406.47

(58) Field of Classification Search .............. 123/27 R, 123/198 DB, 295, 305, 325, 406.47, 481, 123/486
See application file for complete search history.

(56) References Cited

U.S. PATENT DOCUMENTS 6,983,730 B2 *   1/2006  Kuzuyama ................. 123/294
7,104,248 B2 *   9/2006  Weiss ......................... 123/305
7,121,233 B2 *  10/2006  Kitamura et al. .......... 123/27 R
2005/0224045 A1 * 10/2005  Kuzuyama .................. 123/305
2006/0288966 A1 * 12/2006  Yang .......................... 123/27 R
2007/0028600 A1 *  2/2007  Ogawa et al. ................ 60/285
2007/0028889 A1 *  2/2007  Ogawa et al. .............. 123/295
2007/0113541 A1 *  5/2007  Jankovic ...................... 60/285
2007/0113546 A1 *  5/2007  Jankovic ...................... 60/287
2007/0149336 A1 *  6/2007  Sallstrom ........................ 475/5

FOREIGN PATENT DOCUMENTS

| JP | 2002-130006 A | 5/2002 |
| JP | 2003-106184 A | 4/2003 |
| JP | 2004-108218 A | 4/2004 |
| JP | 2005-163624 A | 6/2005 |

* cited by examiner

*Primary Examiner*—John T. Kwon
(74) *Attorney, Agent, or Firm*—Crowell & Moring LLP

(57) ABSTRACT

The controller includes combustion mode switching means for decreasing an exhaust gas temperature in the spark ignition combustion immediately before the combustion mode switching based on an estimated exhaust gas temperature immediately before the combustion mode switching, or for decreasing an EGR amount in the HCCI combustion immediately after the combustion mode switching.

16 Claims, 17 Drawing Sheets

CONTROLLER FOR COMPRESSION IGNITION ENGINE

CLAIM OF PRIORITY

The present application claims priority from Japanese application the serial number of which is 2006-70140, filed on Mar. 15, 2006, the content of which is incorporated by reference into this application.

TECHNICAL FIELD

The present invention relates to a controller for an internal combustion engine that performs combustion mode switching between spark ignition combustion and Homogeneous Charge Compression Ignition Combustion (hereinafter referred to as HCCI combustion). More specifically, the invention is directed to a controller for an internal combustion engine that enables prevention of deterioration of exhaust gas and of increase in noise and vibration when performing the combustion mode switching from the spark ignition combustion to the HCCI combustion.

BACKGROUND ART

Among internal combustion engines (hereinafter referred to as engine) used in vehicles or the like, attention has been paid to a compression ignition gasoline engine (hereinafter referred to as a compression ignition engine) as an engine that improves both fuel consumption performance as well as exhaust performance. This compression ignition engine is designed to compress an air-fuel mixture to cause auto ignition combustion (hereinafter referred to as HCCI combustion). The compression ignition engine reduces fuel consumption because of high efficiency by high compression and of decrease in pump loss and in cooling loss by rapid combustion, as compared with spark ignition combustion which ignites and burns the air-fuel mixture by sparks of an ignition plug. Also, the compression ignition engine decreases a mass of NOx emission because of low-temperature combustion of the air-fuel mixture. This can achieve improvement both in fuel consumption performance and exhaust performance.

Means for performing the HCCI combustion include intake overheating, high compression, and introduction of an internal EGR. However, taking into consideration cost and driving by the spark ignition combustion, the introduction of the internal EGR by manipulation of valve timing is the most practicable means. In performing the HCCI combustion by the introduction of the internal EGR, a great amount of the internal EGR gas is required in a combustion chamber. This restricts new gas, and hence in a naturally-aspirated engine, the HCCI combustion can be carried out at low loads and low revolutions as shown in FIG. 1. Thus, when the compression ignition engine is applied to a vehicle, the compression ignition engine performs both the spark ignition combustion and the HCCI combustion, and achieves an engine torque requested by a driver by switching between these combustion modes.

The related art associated with combustion mode switching between the spark ignition combustion and the HCCI combustion is disclosed in, for example, JP-A-2002-130006, and JP-A-2003-106184. In the related art, when intending to perform the combustion mode switching from the spark ignition combustion to the HCCI combustion, engine parameters are changed to predetermined set values for performing the respective combustion modes, thereby to perform the combustion mode switching. Particularly, in order to achieve the HCCI combustion, a negative valve overlap period in which an exhaust valve and an intake valve are both closed in an exhaust stroke is lengthened in the HCCI combustion, as compared with the spark ignition combustion, so as to introduce a great amount of the internal EGR gas. This increases the temperature in a cylinder, thereby improving ignitability of the air-fuel mixture.

[Patent Document 1] JP-A-2002-130006
[Patent Document 2] JP-A-2002-106184

SUMMARY OF THE INVENTION

FIG. 2 shows an example of time series of a negative valve overlap period, an exhaust gas temperature, ignition timing, a mass of NOx emission, and a pressure rise rate in combustion mode switching when the above-mentioned related art is applied (which represents increase in negative valve overlap period, and in exhaust gas temperature, quickening of ignition timing, and increase in mass of NOx emission and in pressure rise rate, towards the upper part of the figure). Note that the mass of NOx emission means a mass of NOx emission downstream of a three-way catalyst when it is employed as an exhaust purification device. When the combustion mode switching from the spark ignition combustion to the HCCI combustion is determined to be possible, the negative valve overlap period is increased to increase the mass of internal EGR so as to change the state of combustion into the HCCI combustion. At this time, the combustion temperature in the spark ignition combustion differs greatly from that in the HCCI combustion, that is, the combustion temperature in the spark ignition combustion is higher than that of the latter, so that the exhaust gas temperature immediately after the combustion mode switching, that is, the temperature of the internal EGR becomes high. Thus, when the exhaust temperature is increased to more than a predetermined value immediately after the combustion mode switching, the ignition timing in the HCCI combustion is quickened to be equal to or above an allowable level. The quickening of the ignition timing increases the combustion temperature, while causing the pressure rise rate to be increased so as to be equal to or above an allowable level. This leads to increase in the mass of NOx emission and in vibration and noise.

In other words, none of the related art has taken into consideration the quickening of the ignition timing in the combustion mode switching from the spark ignition combustion to the HCCI combustion. This poses a problem that the deterioration of the exhaust gas and the increase in noise and vibration cannot be prevented in the combustion mode switching.

The invention has been accomplished in view of the foregoing problem. It is therefore an object of the invention to provide a controller for an internal combustion engine for performing combustion mode switching between the spark ignition combustion and the HCCI combustion and which can prevent the deterioration of the exhaust gas due to increase in mass of NOx emission and the increase in vibration and noise due to increase in pressure rise rate when performing the combustion mode switching from the spark ignition combustion to the HCCI combustion.

The foregoing object is achieved by a controller for an internal combustion engine, which is characterized by the following. The controller for an internal combustion engine adapted for performing the spark ignition combustion and the HCCI combustion for introduction of EGR includes, when performing the combustion mode switching from the spark ignition combustion to the HCCI combustion, first combustion mode switching means for decreasing an exhaust gas temperature in the spark ignition combustion before the combustion mode switching to perform the combustion mode switching. Alternatively, the controller includes second combustion mode switching means for decreasing the EGR in the HCCI combustion immediately after the combustion mode switching to perform the combustion mode switching.

As can be seen from the above-mentioned description, the controller for an internal combustion engine of the invention includes, when performing the combustion mode switching from the spark ignition combustion to the HCCI combustion, combustion mode switching means for decreasing the exhaust gas temperature in the spark ignition combustion, or combustion mode switching means for adjusting the internal EGR in the HCCI combustion. The combustion mode switching means prevents increase in mass of NOx emission and pressure rise rate in the combustion mode switching, thereby enabling prevention of deterioration of the exhaust gas and increase in vibration and noise.

DETAILED DESCRIPTION OF THE PREFERRED EMBODIMENTS

FIRST EXAMPLE

Figure 3:
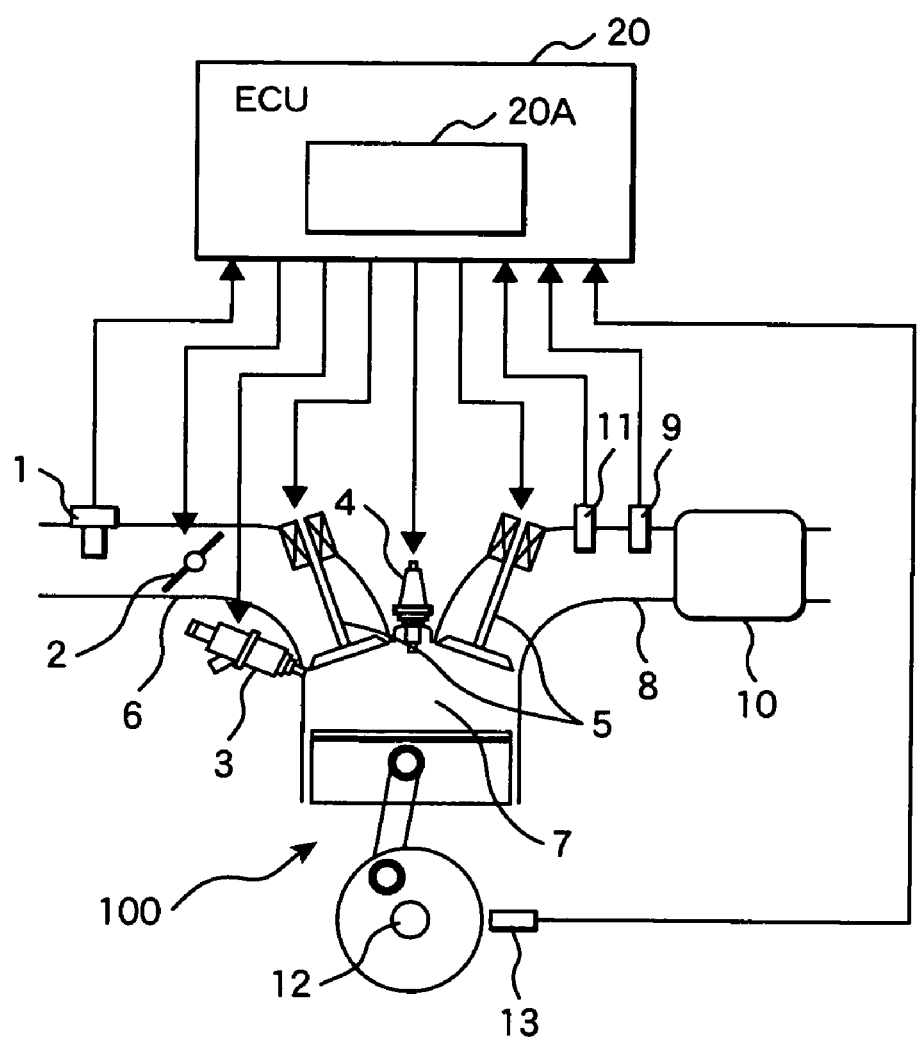
FIG. 3 is a system configuration diagram of a first example in which a controller of an internal engine of an embodiment of the invention is applied to an in-cylinder injection engine.

One example of a first embodiment of the invention will be described below with reference to the accompanying drawings. FIG. 3 shows the first embodiment of the invention, and is a system configuration diagram of a system in which a controller for a compression ignition engine of the embodiment is applied to a gasoline engine for a vehicle.

An engine 100 is a compression ignition engine which performs spark ignition combustion and HCCI combustion. An air flow sensor 1 for measuring an amount of intake air, and an electronic control throttle 2 for adjusting a flow rate of intake air are disposed in respective appropriate positions of an intake pipe 6. In respective appropriate positions of a cylinder 7 are provided an injector 3 for injecting fuel to a combustion chamber, an ignition plug 4 for supplying ignition energy, and a variable valve 5 for adjusting intake gas flowing into the cylinder, exhaust gas discharged from the cylinder, and the EGR gas in the cylinder. Furthermore, in respective appropriate positions of an exhaust pipe 8 are provided a three-way catalyst 10 for purifying the exhaust gas, an air/fuel ratio sensor 9 serving as one form of an air/fuel ratio detector for detecting an air/fuel ratio of the exhaust gas at the upstream side of the three-way catalyst 10, and an exhaust gas temperature sensor 11 serving as one form of an exhaust gas temperature detector for measuring the exhaust gas temperature on the upstream side of the three-way catalyst 10. Moreover, a crankshaft 12 is provided with a crank angle sensor 13 for computing a rotation angle.

Respective signals from the air flow sensor 1, the air/fuel ratio sensor 9, the exhaust gas temperature sensor 11, and the crank angle sensor 13 are fed to a control unit (hereinafter referred to as an ECU) 20. From these sensor outputs, data on an operational state of the engine is obtained, and then an air flow rate, a fuel injection amount, and a main operation amount of the engine at the ignition timing are computed optimally.

The fuel injection amount computed by the ECU 20 is converted to a valve-opening pulse signal, which is fed to the injector 3. A driving signal is sent to the ignition plug 4 such that ignition occurs at ignition timing computed by the ECU 20. A position of the throttle valve computed by the ECU 20 is sent to the electronic control throttle. A variable-valve driving signal computed by the ECU 20 is fed to the variable valve 5.

Figure 4:
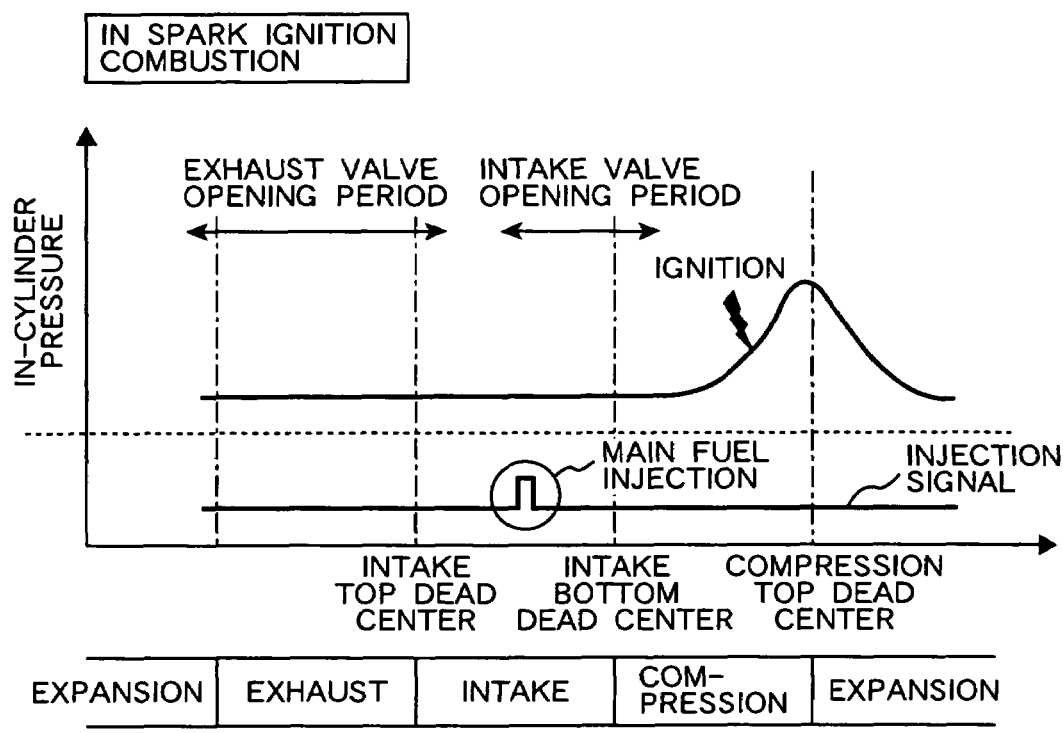
FIG. 4 is a diagram showing a pressure profile and fuel injection timing in one cycle in performing the spark ignition combustion by an engine controller.

When performing the spark ignition combustion, fuel is injected (injection of main fuel) to air flowing from the intake pipe 6 into the cylinder 7 via the variable valve 5 to form an air-fuel mixture. The air-fuel mixture explodes by sparks occurring from the ignition plug 4 at predetermined ignition timing, and combustion pressure pushes down a piston, which becomes a driving force of the engine. Furthermore, the exhaust gas after explosion is fed into the three-way catalyst 10 via the exhaust pipe 8, and exhaust components thereof are purified in the three-way catalyst 10 to be discharged to the outside. FIG. 4 shows an example of a schematic operation of the engine 100, including intervals for opening an exhaust valve and an intake valve, main fuel injection, and timing of ignition in the spark ignition combustion.

Figure 5:
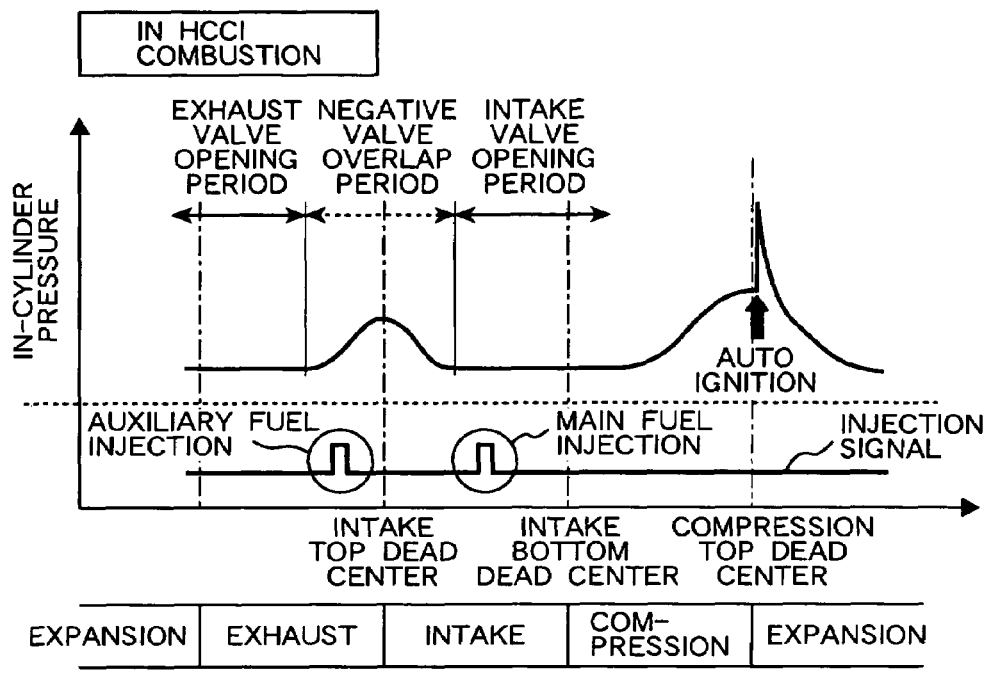
FIG. 5 is a diagram showing a pressure profile and fuel injection timing in one cycle in performing the HCCI combustion by the engine controller.

When performing the HCCI combustion, the negative valve overlap period in which the variable valve 5 is closed in the exhaust stroke is provided to cause the internal EGR gas to remain inside the cylinder 7, and during this time, the fuel is injected (auxiliary fuel injection) from the injector 3. This modifies the fuel to generate the so-called ignition agent serving as an ignition source. Furthermore, in the intake stroke, air flows from the intake pipe 6 into the cylinder 7 via the variable valve 5, and fuel injection (main fuel injection) is performed again to form the air-fuel mixture. The air-fuel mixture explodes by compression of the piston, and then the combustion pressure presses down the piston, which becomes the driving force of the engine. Thereafter, like the spark ignition combustion, the exhaust gas is purified by the three-way catalyst 10 and exchanged to the outside. FIG. 5 shows an example of a schematic operation of the engine 100, including intervals for opening the exhaust valve and the intake valve in the HCCI combustion, the negative valve overlap period, and the main and auxiliary fuel injection timings.

Figure 6:
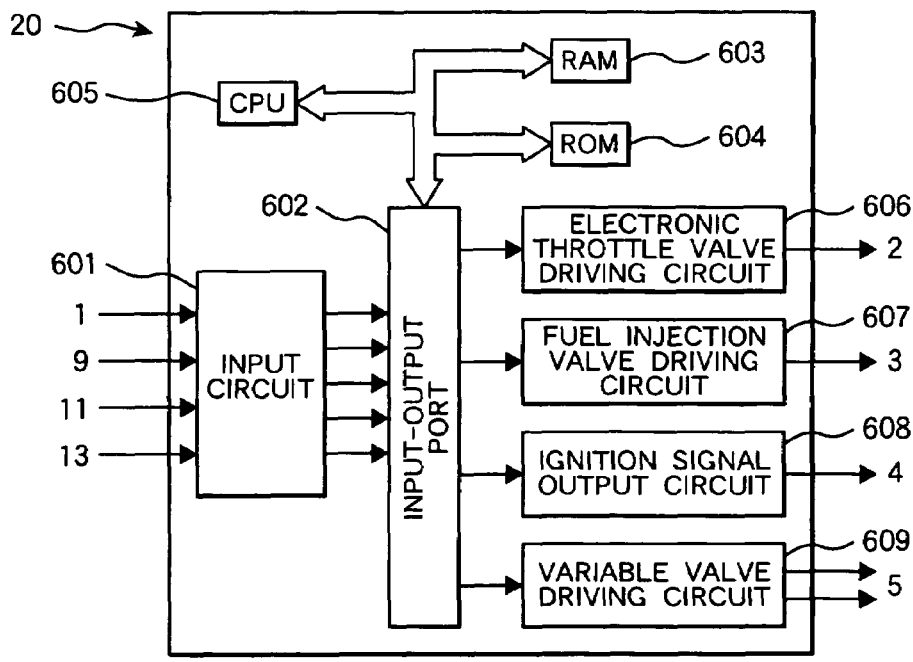
FIG. 6 is a diagram of an inner configuration of an ECU in the first example.

FIG. 6 shows the inside of the ECU 20. In the ECU 20, output signals of the air flow sensor 1, the air/fuel ratio sensor 9, the exhaust temperature sensor 11, and the crank angle sensor 13 are input into an input circuit 601. Note that the input signals are not limited thereto. The input signals of the sensors are fed to an input-output port 602. The value of the input port in the input-output port 602 is stored in a RAM 603, and computed within a CPU 605. A control program containing the contents of computation processing is previously written in a ROM 604. After a value indicative of an operational amount of each actuator which is computed according to the control program is stored in the RAM 603, data on the value is transferred to the output port of the input-output port 602, and then sent to each actuator via each driving circuit.

The ECU 20 includes a combustion mode switching controller 20A (see FIG. 3) that prevents the deterioration of exhaust gas and the increase in vibration and noise when performing combustion mode switching from the spark ignition combustion to the HCCI combustion. Now, the control of the combustion mode switching from the spark ignition combustion to the HCCI combustion by the combustion mode switching controller 20A will be described. In particular, the combustion mode switching controller 20A in this example is adapted to previously decrease the exhaust temperature of the spark ignition combustion in the combustion mode switching, thereby preventing the deterioration in exhaust gas and the increase in vibration and noise in the combustion mode switching.

Figure 7:
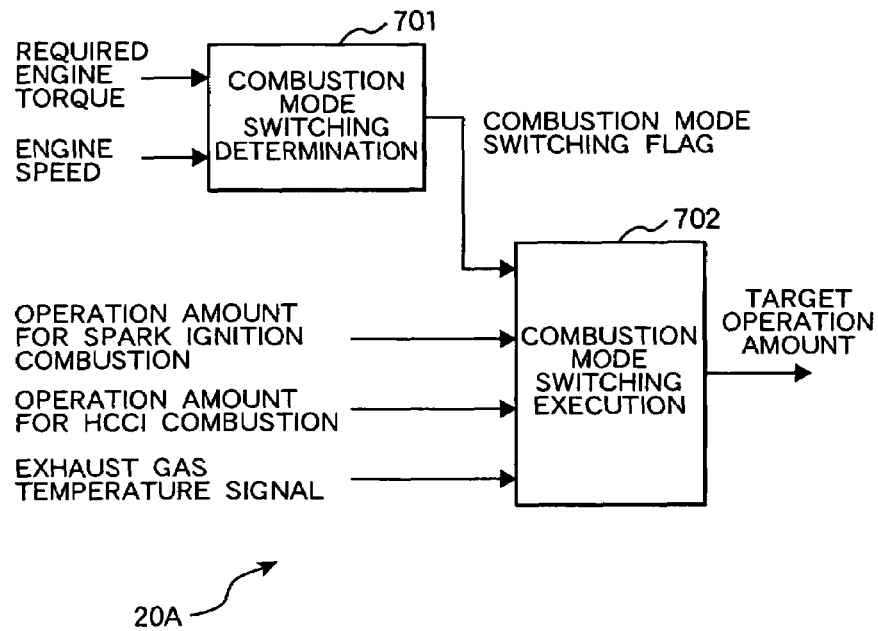
FIG. 7 is a control block diagram of a combustion mode switching controller 20A of FIG. 3 in the first example.

FIG. 7 is a control block diagram of the combustion mode switching control by the combustion mode switching controller 20A of the ECU 20. The combustion mode switching controller 20A includes a combustion mode switching determination 701 for determining whether the combustion mode switching is practicable or not, and a combustion mode switching execution 702 for executing the combustion mode switching based on the result of determination by the combustion mode switching determination.

Figure 1:
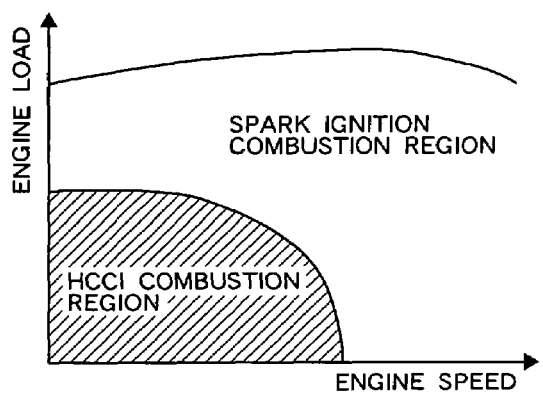
FIG. 1 is a diagram showing operation areas or switchable areas of spark ignition combustion and HCCI combustion.
Figure 2:
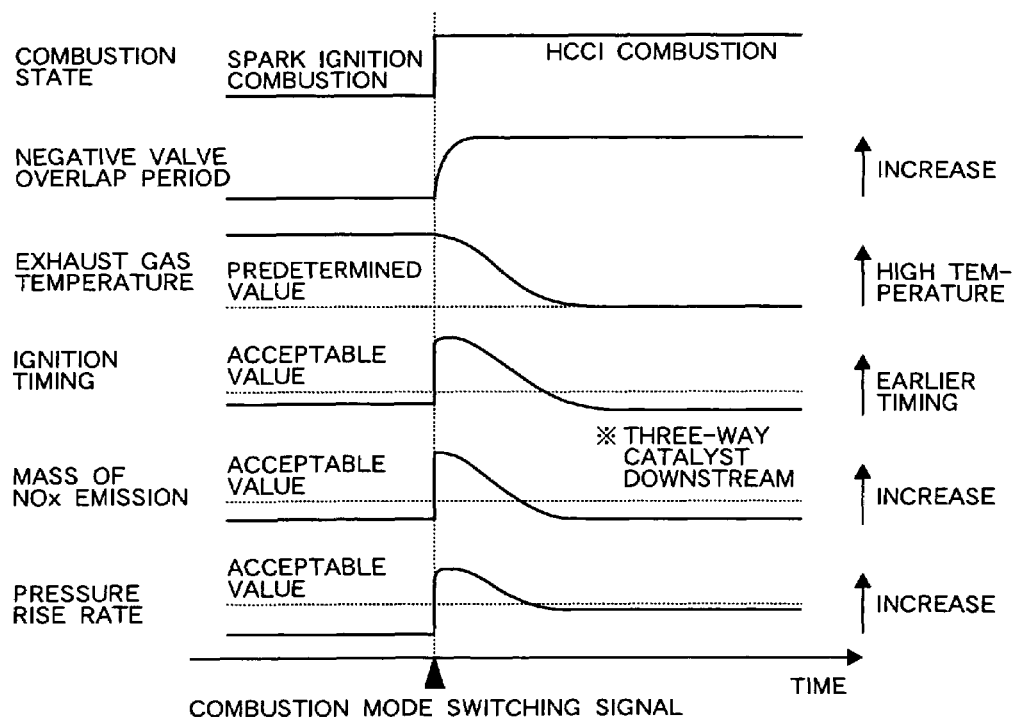
FIG. 2 is a diagram showing time series of combustion states, a negative valve overlap period, an exhaust gas temperature, ignition timing, a mass of NOx emission, and a pressure rise rate in combustion mode switching from the spark ignition combustion to the HCCI combustion when the related art is applied.

The combustion mode switching determination 701 determines whether the combustion mode switching is possible or not based on a required engine torque and engine speed required by the engine, and outputs the determination to the combustion mode switching execution 702 after setting of a combustion mode switching flag. The combustion mode switching determination 701 includes a map which shows the state of combustion, for example, based on the engine speed and engine loads as shown in FIG. 1. In an operation state where the HCCI combustion can be carried out, the combustion mode switching determination 701 determines that the HCCI combustion is practicable according to the required engine torque and engine speed, and then sets the combustion mode switching flag to ON (=1). In contrast, in an operation state where the HCCI combustion cannot be carried out, the determination determines that the spark ignition combustion needs to be performed, and then sets the combustion mode switching flag to OFF (=0).

The combustion mode switching execution 702 computes a target operation amount based on a combustion mode switching flag, an operation amount for the spark ignition combustion which is an operation amount of the engine for performing the spark ignition combustion, an operation amount for the HCCI combustion which is an operation amount of the engine for performing the HCCI combustion, and an exhaust gas temperature signal which is an output signal of the exhaust gas temperature sensor. The combustion mode switching execution outputs the target operation amount computed to the engine. More specifically, the operation amount for the spark ignition combustion is corrected based on the combustion mode switching flag. After the exhaust gas temperature is equal to or less than a predetermined value, when it is determined that switching to the HCCI combustion may not lead to deterioration of the exhaust gas and increase in vibration and noise, the engine operation amount is changed to the operation amount for the HCCI combustion. This achieves the combustion mode switching from the spark ignition combustion to the HCCI combustion. The operation amount is a parameter that makes the engine operable in real time. The operation amounts indicate a position of throttle valve of the electronic control throttle 2, a fuel injection amount or fuel injection timing of the injector 3, an ignition timing signal of the ignition plug 4, valve timing which is timing of opening and closing the variable valve 5, and the like.

Figure 8:
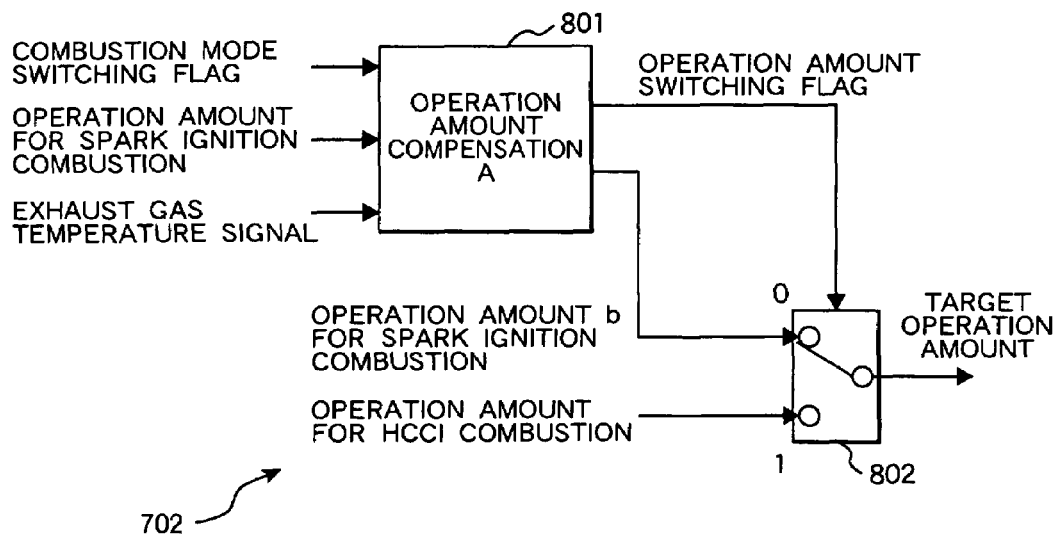
FIG. 8 is a control block diagram of a combustion mode switching execution of FIG. 7 in the first example.

FIG. 8 is a block diagram of the combustion mode switching execution 702. The execution 702 includes an operation amount compensation A801 for performing computations of an operation amount switching flag and an operation amount b for the spark ignition combustion based on the combustion mode switching flag, the operation amount for the spark ignition combustion, and the exhaust gas temperature signal. The execution 702 also includes a switch 802 for selecting between the operation amount b for the spark ignition combustion and the operation amount for the HCCI combustion and for setting the selected one as the target operation amounts, based on the operation amount switching flag.

Figure 9:
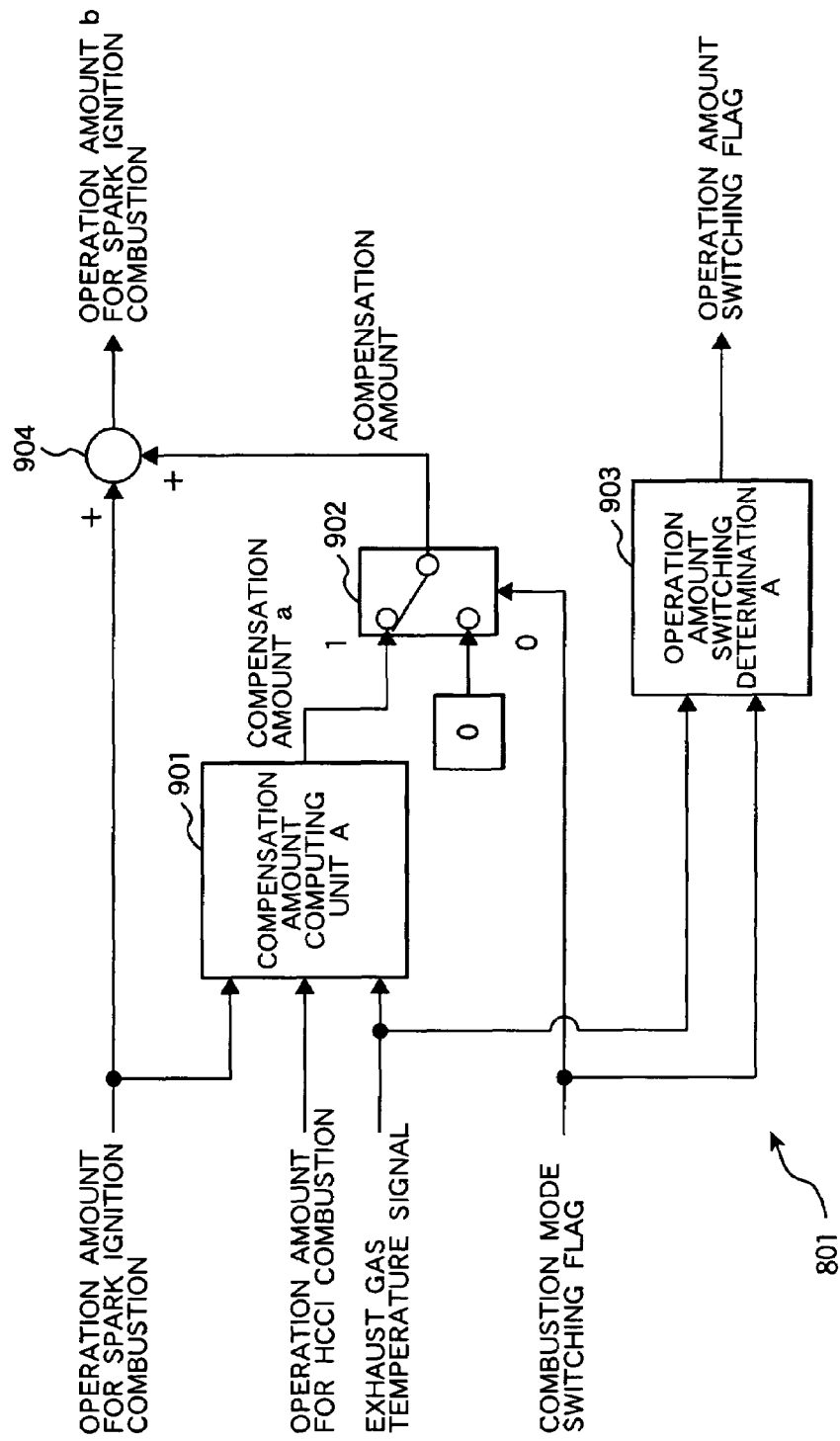
FIG. 9 is a control block diagram of an operation amount compensation of FIG. 8 in the first example.

FIG. 9 is a block diagram of the operation amount compensation A801. The operation amount compensation A801 includes a compensation amount calculation A901, a switch A902 for selecting a compensation amount, an operation amount switching determination A903 for computing an operation amount switching flag, and an adder 904 for adding a compensation amount which is an output of the switch 902 to the operation amount for the spark ignition combustion.

The compensation amount calculation A901 outputs a compensation amount a based on the operation amount for the spark ignition combustion, the operation amount for the HCCI combustion, and the exhaust gas temperature signal. More specifically, the calculation also includes a combustion model for estimating the exhaust gas temperature from the operation amount for performing each combustion mode. The calculation computes the exhaust gas temperatures in the spark ignition combustion as well as in the HCCI combustion. Based on a deviation between both exhaust gas temperatures, the calculation computes a compensation amount for decreasing the exhaust gas temperature to output it as a compensation amount a. The compensation amount is, for example, closing timing of an exhaust valve, or a negative valve overlap period which can control amass of internal EGR for being capable of decreasing the exhaust gas temperature in the spark ignition combustion. Note that the quickening of the exhaust valve closing timing increases the negative valve overlap period. Based on the operation amounts for both combustion modes which are predetermined in shipping, the exhaust gas temperatures are estimated to determine the compensation amount a. In addition, based on the exhaust gas temperature signal output from the exhaust gas temperature sensor, the calculation computes the compensation amount a which sets the exhaust gas temperature to a predetermined value or less. Alternatively, based on a difference between the exhaust gas temperature estimated from the operation amount for the HCCI combustion and the exhaust gas temperature signal, the level of the operation amount a may be computed.

When the combustion mode switching flag is ON (=1), the switch 902 sets the compensation amount a which is an output of the compensation amount calculation A901, as a compensation amount a so as to perform the combustion mode switching from the spark ignition combustion to the HCCI combustion. When the combustion mode switching flag is OFF (=0), the compensation amount is set to zero because the combustion mode switching from the spark ignition combustion to the HCCI combustion is not performed.

The operation amount switching determination A903 computes the operation amount switching flag based on the exhaust gas temperature signal and the combustion mode switching flag. More specifically, for the exhaust gas temperature signal that is equal to or more than a predetermined value when switching from the spark ignition combustion to the HCCI combustion, it is determined that the deterioration in exhaust gas and the increase in vibration and noise may occur. Then, the operation amount switching flag is set to OFF (=0), and hence the combustion mode switching is not performed. When the exhaust gas temperature signal is equal to or less than the predetermined value, it is determined that the deterioration in exhaust gas and the vibration and noise may not occur in the combustion mode switching. When the combustion mode switching flag is ON (=1), the operation amount switching flag is set to ON (=1), and then the combustion mode switching is performed. Although not shown in the figure, in another embodiment, when a deviation between the exhaust gas temperature estimated from the operation amount for the HCCI combustion and the exhaust gas temperature signal is equal to or less than a predetermined value, the operation amount switching flag may be set to ON (=1). Moreover, based on the exhaust gas temperature estimated from the operation amount for the spark ignition combustion and the exhaust gas temperature estimated from the operation amount for the HCCI combustion, the operation amount switching flag may be set to ON (=1) after delay of only a predetermined time from the time when the combustion mode switching flag is changed from OFF (=0) to ON (=1).

When the operation amount switching flag is OFF (=0), the switch 802 provided in the combustion mode switching execution 702 sets the operation amount b for the spark ignition combustion as the target operation amount. When the operation amount switching flag is ON (=1), the target operation amount is set to the operation amount for the HCCI combustion so as to perform the combustion mode switching.

Under the above-mentioned control, when the combustion mode switching is performed from the spark ignition combustion to the HCCI combustion, the exhaust gas temperature in the spark ignition combustion just before the combustion mode switching is previously decreased. This can prevent the deterioration of the exhaust gas and the increase in vibration and noise which would result from the increase in the mass of NOx emission and in pressure rise rate due to the increase in the exhaust gas temperature in the HCCI combustion immediately after the combustion mode switching.

Figure 10:
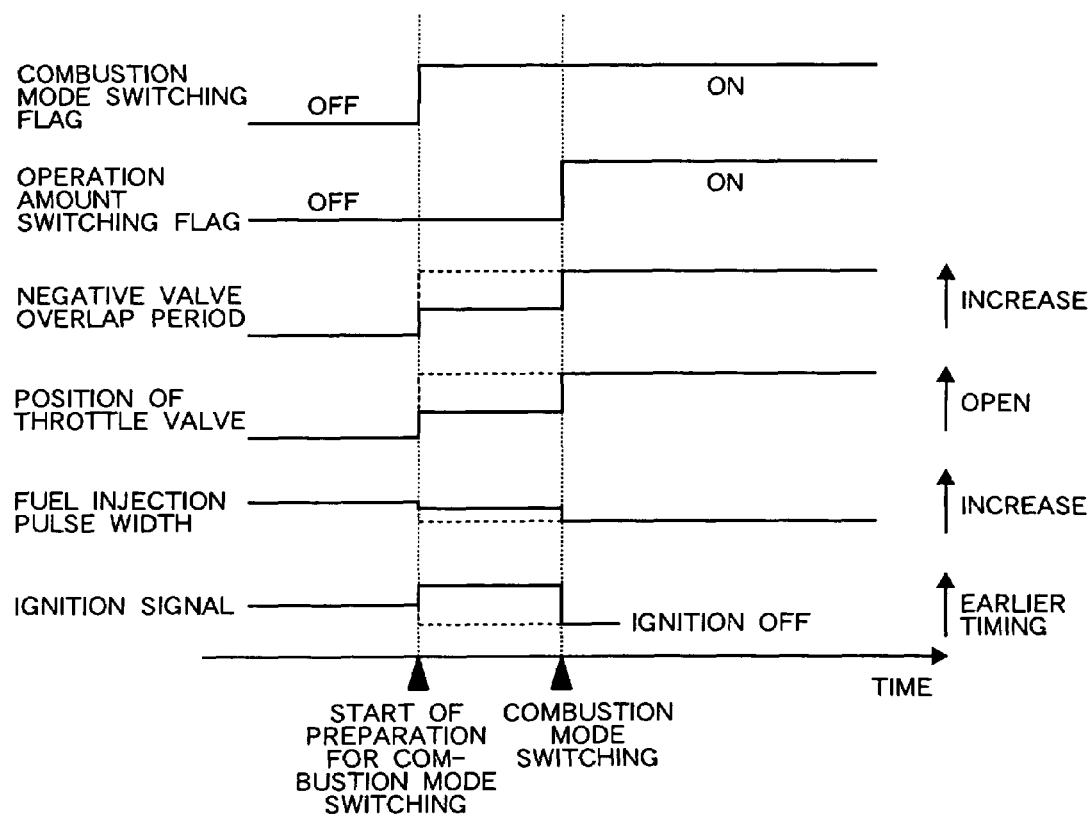
FIG. 10 is a chart diagram of a combustion mode switching flag, an operation amount switching flag, a negative valve overlap period, a position of a throttle valve, a fuel injection pulse width, and an ignition signal in performing the combustion mode switching in the first example.

FIG. 10 shows an example of the control of the combustion mode switching from the spark ignition combustion to the HCCI combustion by the combustion mode switching controller 20A. FIG. 10 shows time series of respective target values of the following: a combustion mode switching flag, an operation amount switching flag, a negative valve overlap period indicative of an interval from exhaust valve closing timing to intake valve opening timing among timing of the variable valve 5, a position of the electronic control throttle 2, a fuel injection pulse width of the injector 3, and timing of an ignition signal of the ignition plug 4 (which respectively represents the combustion mode switching flag ON, the operation amount switching flag ON, increase in negative valve overlap period, in position of the throttle valve, and in fuel injection pulse width, and quickening of the ignition timing, towards the upper part of the figure). The broken line represents the case in which the related art is applied, and the solid line represents the case in which the present embodiment is applied.

When performing the combustion mode switching by the controller to which the related art is applied, the target value is switched from the set value of the operation amount in the spark ignition combustion to the set value of the operation amount in the HCCI combustion.

In the present control by the combustion mode switching controller 20A, first, when the combustion mode switching determination 701 determines that the HCCI combustion is practicable, the combustion mode switching flag is set to ON (=1). Then, although not shown in FIG. 10, the compensation amount for compensating the operation amount in the spark ignition combustion is computed based on the operation amount for the spark ignition combustion, the operation amount for the HCCI combustion, and the like. The compensation amount computed is added to each operation amount. The negative valve overlap period shown in FIG. 10 is increased such that the mass of internal EGR is increased so as to decrease the exhaust gas temperature in the spark ignition combustion (or the timing of closing the exhaust valve is quickened). The position of the throttle valve is increased so as to prevent a decrease in amount of air with increase in the mass of internal EGR. Moreover, in order to prevent reduction in fuel stability in the increase in the mass of internal EGR, the ignition signal is quickened. And, the fuel injection pulse width is decreased so as to prevent the increase in torque accompanied with the quickening.

After the above-mentioned compensation is performed in the spark ignition combustion, although not shown in FIG. 10, the combustion mode switching execution 702 compares the exhaust gas temperature signal with a predetermined value of the exhaust gas temperature. When the exhaust gas temperature signal is equal to or less than the predetermined value, the operation amount switching flag is set to ON (=1) so as to perform the combustion mode switching. After the operation amount switching flag is set, the target value of each operation amount is changed to the set value for the HCCI combustion so as to perform the HCCI combustion. More specifically, since the mass of internal EGR is increased so as to increase the in-cylinder temperature, the negative valve overlap period is increased (or the closing timing of the exhaust valve is quickened). Furthermore, in order to prevent the change in mass of air due to the increase in the mass of internal EGR, the position of the throttle valve is increased largely. Moreover, since the HCCI combustion is more effective than the spark ignition combustion, the fuel injection pulse width is decreased so as to prevent any change in torque before and after the combustion mode switching. Thus, the change in torque before and after the combustion mode switching is prevented. As the operation amount switching flag is ON (=1) to avoid misfire in a predetermined interval, the ignition signal is turned ON. However, after the predetermined time period, the ignition signal is cut so as to decrease electric power energy.

The combustion mode switching controller 20A with this arrangement performs the combustion mode switching from the spark ignition combustion to the HCCI combustion, while enabling prevention of the deterioration of the exhaust gas and the increase in vibration and noise. The target operation amount for either of the combustion states needs to be previously determined as the optimal value for each operation condition by an experiment or simulation, and be set as a map or a model.

Figure 11:
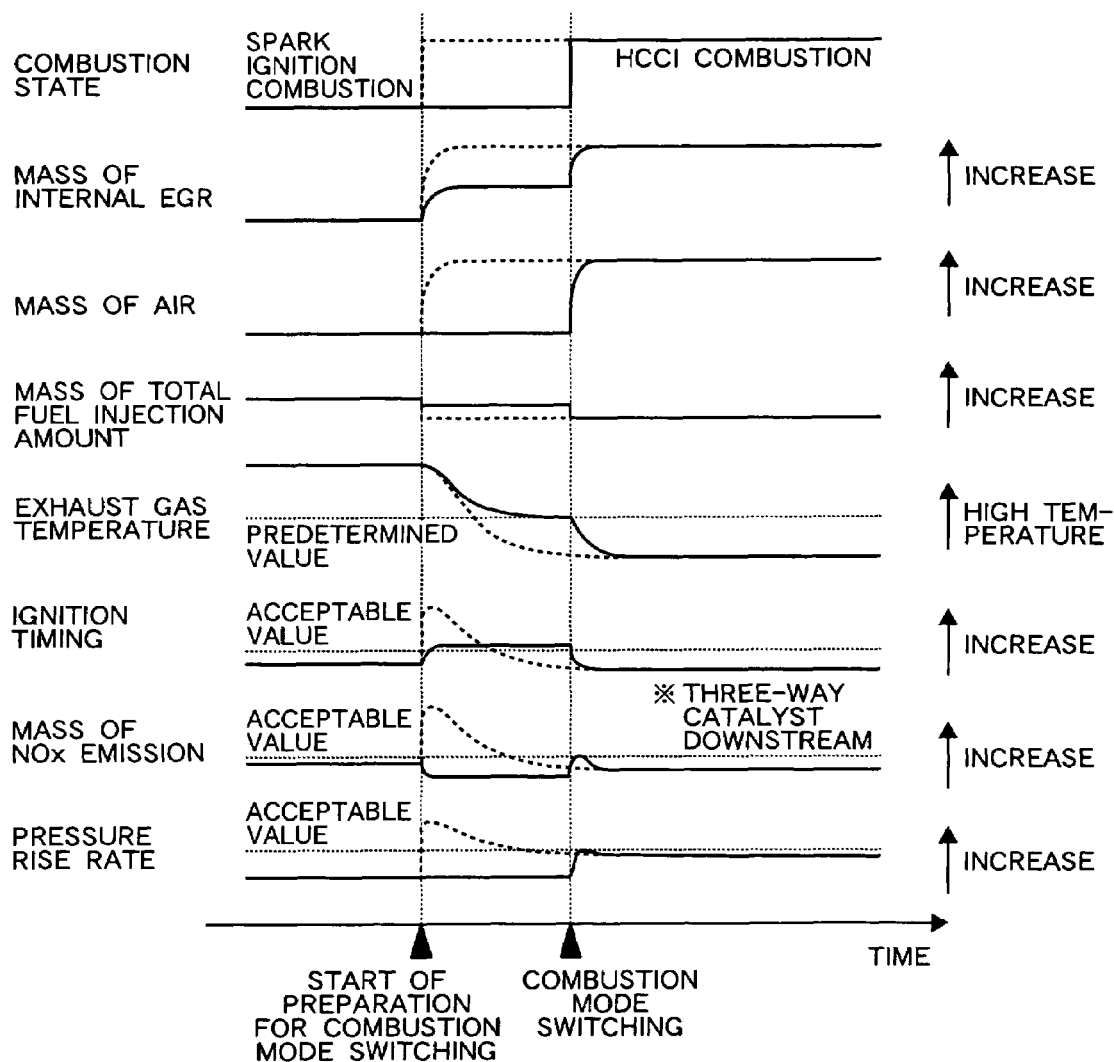
FIG. 11 is a chart diagram of combustion states, a negative valve overlap period, an exhaust gas temperature, ignition timing, a mass of NOx emission, and a pressure rise rate in performing the combustion mode switching in the first example.

FIG. 11 shows time series of combustion states in the cylinder 7, a mass of internal EGR, an amount of air, a mass of total fuel injection, an exhaust gas temperature detected by the exhaust gas temperature sensor 11, ignition timing of an air-fuel mixture in the cylinder 7, a mass of NOx emission discharged by the variable valve 5, and a pressure rise rate in the cylinder 7 when the present control is performed by the combustion mode switching controller 20A (which represents increase in the mass of internal EGR, in the mass of air, in the fuel injection amount, and in the exhaust gas temperature, the quickening of the ignition timing, increase in the mass of NOx emission, and in pressure rise rate, towards the upper part of the figure).

The broken line represents the case in which the related art is applied, and the solid line represents the case in which the present embodiment is applied.

In performing the combustion mode switching by the related art, only the operation amount is changed according to the combustion state. Thus, the exhaust gas temperature immediately after the combustion mode switching becomes high, so that the mass of NOx emission and the pressure rise rate increase to be equal to or more than the respective acceptable values. This might lead to the deterioration of the exhaust gas and the increase in vibration and noise.

In the present control by the combustion mode switching controller 20A, after the combustion mode switching flag becomes ON (=1), preparation for the combustion mode switching is started. In order to decrease the exhaust gas temperature in the spark ignition combustion, the negative valve overlap period is increased (or the closing timing of the exhaust valve is quickened), so that the mass of internal EGR is increased. Since the position of the throttle valve is enlarged so as to prevent the decrease in mass of air due to the increase in the mass of internal EGR, the mass of air does not change. The fuel injection amount is increased so as to prevent the increase in torque by the quickening of the ignition signal. The quickening of the ignition signal leads to the earlier ignition timing. The above-mentioned compensation of the operation amount increases the mass of internal EGR in the spark ignition combustion. This results in decrease in the exhaust gas temperature as well as in the combustion temperature, so that the mass of NOx emission is decreased and the pressure rise rate may be equal to or less than the allowable value.

The exhaust gas temperature is monitored using the exhaust gas temperature sensor 11. When the exhaust gas temperature signal is equal to or less than a predetermined value, it is determined that the combustion mode switching to the HCCI combustion is practicable, while preventing the deterioration of the exhaust gas and the increase in the vibration and noise. Then, the operation amount switching flag is set to ON (=1). After the operation amount switching flag is set to ON (=1), even when the target value of each operation amount is set to the set value for the HCCI combustion, the exhaust gas temperature is still decreased during a combustion mode switching preparation interval. Thus, even when the combustion is switched to the HCCI combustion mode, the ignition timing is equal to or below the allowable value, so that the mass of NOx emission is equal to or below the allowable value, and the pressure rise rate is equal to or below the allowable value. This can prevent the deterioration of the exhaust gas and the vibration and noise in the combustion mode switching.

Figure 12:
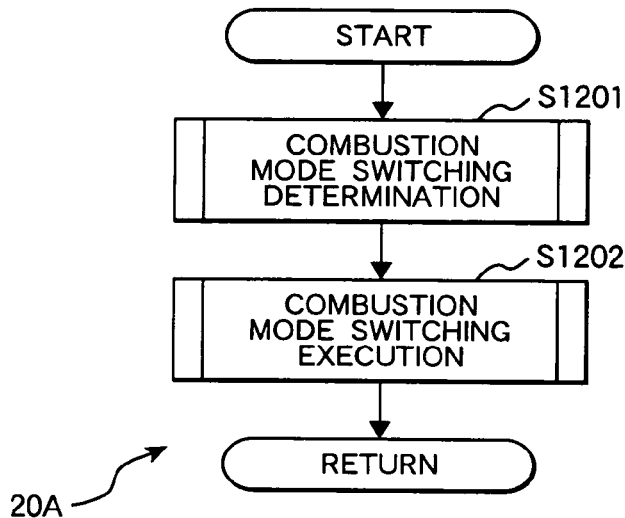
FIG. 12 is an operational flowchart showing the combustion mode switching controller 20A of FIG. 3 in the first example.

FIGS. 12 to 15 are operational flow charts of the control of the combustion mode switching by the combustion mode switching controller 20A. FIG. 12 represents the flowchart of the control block of FIG. 7. In step S1201, the practicable combustion state is determined based on the map shown in FIG. 1 according to the operation state (engine loads, engine speed, or the like). When the HCCI combustion is practicable, the combustion mode switching flag is turned ON (=1), and the operation proceeds to step S1202. When the HCCI combustion is not practicable, the combustion mode switching flag is turned OFF (=0), and then the operation proceeds to step S1202. In step S1202, the combustion mode switching is carried out according to the combustion mode switching flag, which terminates a series of operations.

Figure 13:
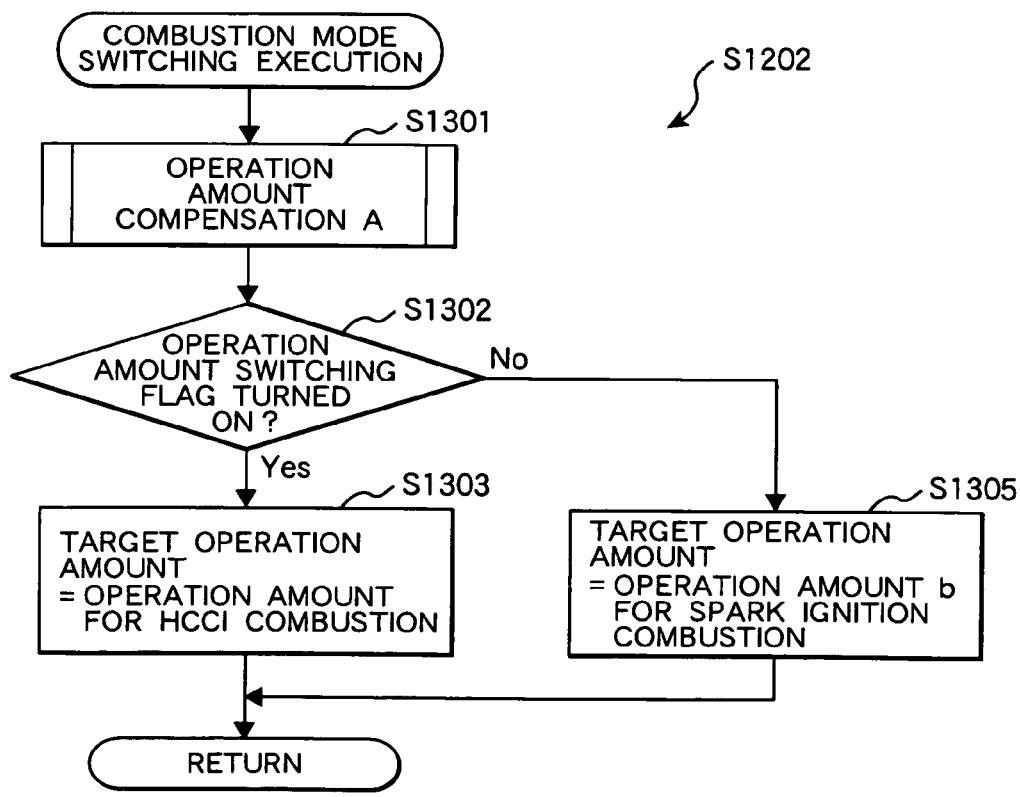
FIG. 13 is an operational flowchart showing a combustion mode switching execution of FIG. 12 in the first example.

FIG. 13 shows an operational flowchart of the combustion mode switching execution S1202. In step S1301, a compensation amount of the operation amount for the spark ignition combustion is computed in the combustion mode switching, and the operation amount switching flag is set. Then, the operation proceeds to step S1302. In step S1302, it is determined whether or not the operation amount switching flag set in step S1301 is ON (=1). When the operation amount switching flag is ON (=1), the operation proceeds to step S1303. Then, the operation amount for the HCCI combustion is switched to the target operation amount, thereby performing the HCCI combustion, which terminates a series of operations. When the operation amount switching flag is OFF (=0) in step S1302, it is determined that the spark ignition combustion needs to be continued in a switching stage to the HCCI combustion, and then the operation proceeds to step S1305. The operation amount b for the spark ignition combustion is set as the target operation amount, so that the spark ignition combustion continues to terminate a series of operations.

Figure 14:
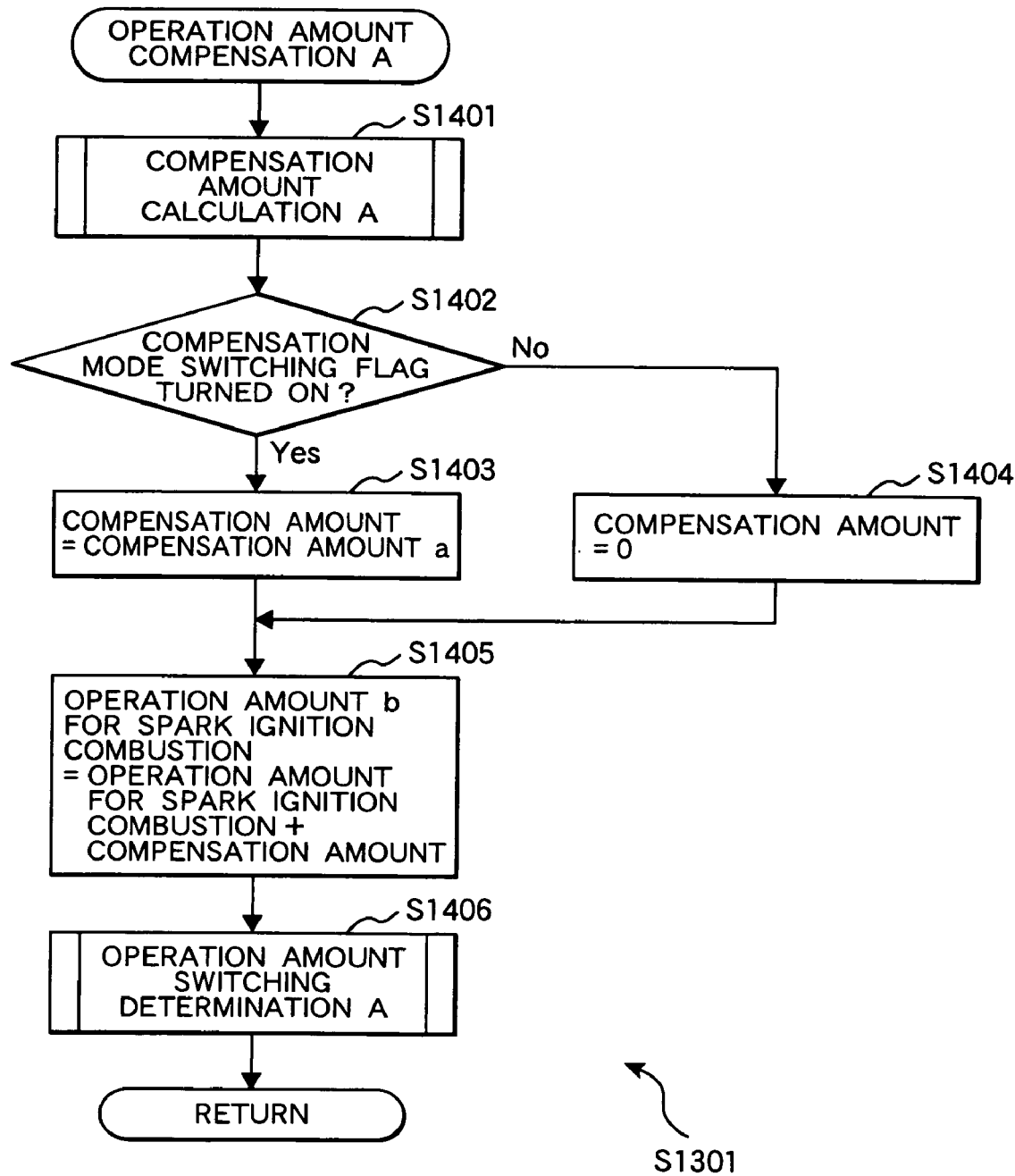
FIG. 14 is an operational flowchart showing an operation amount compensation A of FIG. 13 in the first example.

FIG. 14 is an operational flowchart of the operation amount compensation A in step S1301. In step S1401, the compensation amount a, which is an operation amount for decreasing the exhaust gas temperature in the spark ignition combustion, is computed, and then the operation proceeds to step S1402. In step S1402, it is determined whether or not the combustion mode switching flag is ON (=1). When the combustion mode switching flag is ON (=1), the combustion mode switching is determined to be practicable, and then the operation proceeds to step S1403. In step S1403, the compensation amount a computed by the compensation amount calculation A901 is set as the compensation amount a, and the operation proceeds to step S1405. When the combustion mode switching flag is OFF (=0) in step S1402, it is determined that the combustion mode switching is not practicable, and then the operation proceeds to step S1404. In step S1404, the compensation amount is set to zero, and then the operation proceeds to step S1405. In step S1405, the compensation amount obtained by the computation in the previous steps is added to the operation amount for the spark ignition combustion, and the result is set as the operation amount b for the spark ignition combustion. Thereafter, the operation proceeds to step S1406, in which it is determined whether the operation amount switching is practicable or not. More specifically, it is determined that the exhaust gas temperature is decreased until the combustion mode switching becomes practicable, while preventing the deterioration of the exhaust gas and the increase in vibration and noise, after a predetermined time from the time when the combustion mode switching flag becomes ON (=1). Then, the operation amount switching flag is set to ON (=1). In another example, when the exhaust gas temperature signal which is an output of the exhaust gas temperature sensor is equal to or less than a predetermined value, it is determined that the combustion mode switching is practicable, while preventing the deterioration of the exhaust gas and the increase in vibration and noise, and then the operation amount switching flag is set to ON (=1), which terminates a series of operations. When it is determined in step S1406 that the deterioration of the exhaust gas and the increase in vibration and noise will occur in the combustion mode switching, the operation amount switching flag is set to OFF (=0), which terminates a series of operations.

By the present control performed by the combustion mode switching controller 20A as mentioned above, the combustion mode switching can be carried out from the spark ignition combustion to the HCCI combustion, while preventing the deterioration of the exhaust gas accompanied by the increase in mass of NOx emission, and the increase in vibration and noise accompanied by the increase in pressure rise rate.

Although the preferred embodiment of the invention has been described above, the invention is not limited thereto, and various modifications can be made to designs without departing from the spirit of the invention described in the appended claims.

For example, in the example described above, means for decreasing the exhaust gas temperature before switching to the HCCI combustion is adapted to decrease the exhaust gas temperature by increasing the mass of internal EGR in the cylinder in the spark ignition combustion. Although not shown in FIG. 3, another means may decrease the exhaust gas temperature using a water jet device for injecting water directly into the cylinder. Alternatively, the exhaust gas temperature may be decreased by carrying out water injection during the negative valve overlap period. As a further means, there may be provided means for decreasing the exhaust gas temperature by quickening the ignition timing and by performing an operation of decreasing the fuel injection amount such that an increase in torque corresponding to the quickened time interval is prevented. Additionally, a combination of these above-mentioned means may be performed to decrease the exhaust gas temperature in the spark ignition combustion so as to perform the combustion mode switching to the HCCI combustion.

In the above-mentioned example, means for introduction of the EGR is control of the negative valve overlap period (or the time of closing the exhaust pipe), but the means may not be limited thereto. The valve timing of the variable valve 5 may be controlled so that the exhaust valve is opened during the intake stroke in which the inlet valve is opened to allow the EGR to come into the cylinder.

In the examples described above, as means for achieving the HCCI combustion, is applied means for introducing the internal EGR during the negative valve overlap period in which the valve timing is adjusted, and igniting the air-fuel mixture in the cylinder. When there is provided means for causing the HCCI combustion using the exhausted gas by means of an external EGR pipe for directly introducing the exhaust gas from the exhaust pipe 8 to the intake pipe 6 not shown in FIG. 3, another means for increasing the in-cylinder temperature so as to perform the HCCI combustion may be the following. That is, this means may involve adjusting the external EGR amount to be introduced into the cylinder, thereby decreasing the exhaust gas temperature in the spark ignition combustion. Furthermore, not only the introduction of the external EGR, but also the water injection or the like may also be applied to provide means for decreasing the exhaust gas temperature in the spark ignition combustion.

Although in the above-mentioned example, the means for estimating the exhaust gas temperature is the use of the exhaust gas temperature signal which is an output of the exhaust gas temperature sensor, the exhaust-gas-temperature estimating means is not limited thereto. Although not shown in FIG. 3, there may be provided another means for estimating the exhaust gas temperature using an output signal from a sensor, such as an in-cylinder pressure sensor for directly measuring a change in in-cylinder pressure, an ion current sensor for directly measuring a change in ions in combustion, or a water temperature sensor. This means may estimate the exhaust gas temperature in the combustion mode switching.

A compensation amount for changing the operation amount (the spark ignition combustion operation amount)

for performing the spark ignition combustion just before the combustion mode switching is computed based on the exhaust gas temperature. But EGR amount estimation means may be provided for estimating the EGR amount in the cylinder, and based on an estimated EGR amount by the EGR estimation means, the compensation amount for changing the operation amount may be computed. Furthermore, the EGR amount estimation means may include an engine model to indirectly estimate the EGR amount from the operation amount for the spark ignition combustion. Alternatively, this means may estimate the EGR amount based on exhaust valve closing timing, or the output signal from the sensor, such as the in-cylinder pressure sensor or the ion current sensor.

SECOND EXAMPLE

Now, a second preferred embodiment of the invention will be described with reference to the accompanying drawings. The figures showing this embodiment are the same as those of the first embodiment. FIG. 3 shows a system configuration diagram in which a controller of a compression ignition engine of this embodiment is applied to a gasoline engine for a vehicle. The construction and operation of the ECU 20 of the embodiment are the same as those of the first example (see FIG. 6). A combustion mode switching controller 20A is provided for performing the combustion mode switching so as to prevent the deterioration of the exhaust gas and the increase in vibration and noise. Particularly, the combustion mode switching controller 20A of this example corrects the operation amount for the HCCI combustion in the combustion mode switching. Thus, the deterioration of the exhaust gas and the increase in vibration and noise in the combustion mode switching are prevented even when the exhaust gas temperature immediately after the combustion mode switching is high temperature.

The control block diagram of the combustion mode switching controller 20A is the same as that of the first example, and as shown in FIG. 7, the combustion mode switching controller 20A is constructed of the combustion mode switching determination 701 and the combustion mode switching execution 702. Like the first example, the combustion mode switching determination 701 determines the practical combustion state based on the required engine torque and the engine speed according to the map of FIG. 1. When the HCCI combustion is practical, the combustion mode switching flag is set to ON (=1). When the HCCI combustion is not practical and the spark ignition combustion needs to be performed, the combustion mode switching flag is set to OFF (=0). The combustion mode switching execution 702, like the first example, computes a target operation amount based on the combustion mode switching flag, the operation amount for the spark ignition combustion, the operation amount for the HCCI combustion, and the exhaust gas temperature signal which is an output signal of the exhaust gas temperature sensor. The execution 702 outputs the target operation amount computed to the engine. Like the first example, the operation amounts indicate the position of the throttle valve, the fuel injection amount, the fuel injection timing, the ignition timing, the valve timing, and the like.

Figure 15:
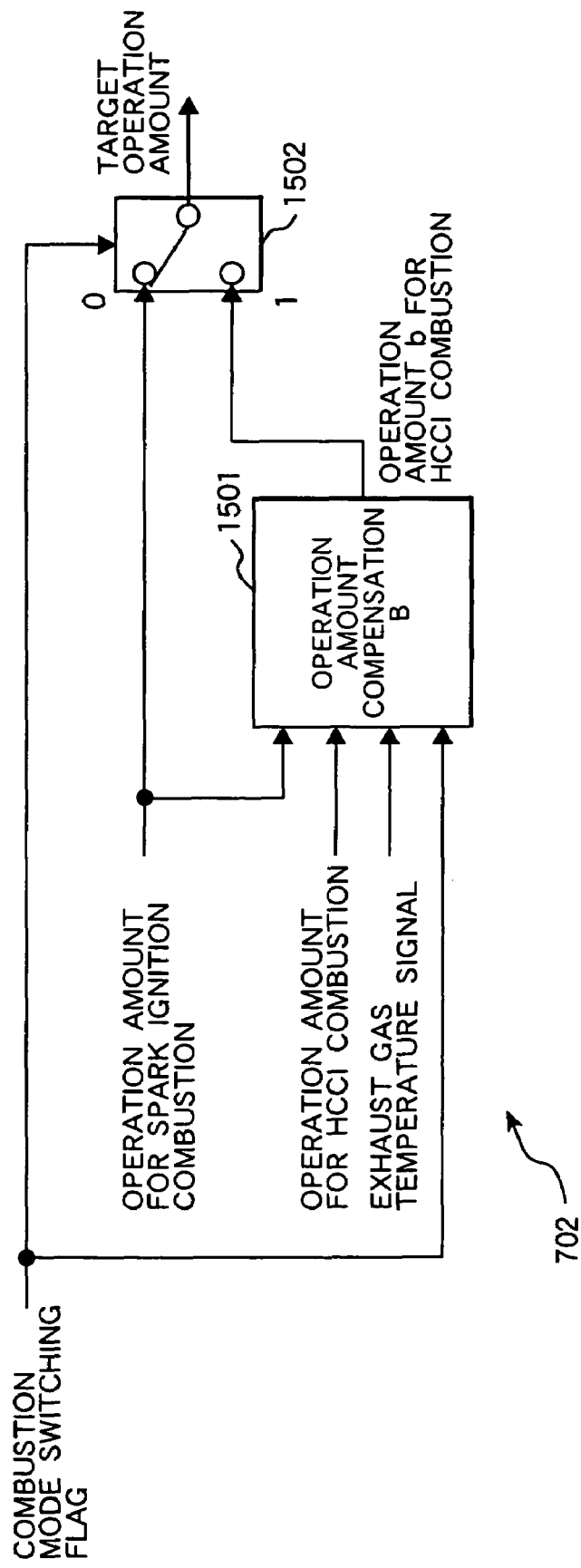
FIG. 15 is a control block diagram showing the combustion mode switching execution of FIG. 7 in a second example.

Now, the combustion mode switching execution 702 will be described in detail. FIG. 15 is a control block diagram of the combustion mode switching execution 702 of this embodiment. The combustion mode switching execution 702 is constructed of an operation amount compensation B1501 and a switch 1502 for selecting a value to be set as the target operation amount.

The operation amount compensation B1501 computes the operation amount b for the HCCI combustion based on the operation amount for the spark ignition combustion, the operation amount for the HCCI combustion, the exhaust air temperature signal, and the combustion mode switching flag. The operation amount for the spark ignition combustion and the operation amount for the HCCI combustion are previously determined on each operation condition as a map by an engine test or a simulation. The exhaust gas temperature signal indicates a signal indicative of the temperature of the exhaust gas passing through the exhaust pipe 8 that is measured by the exhaust gas temperature sensor 11. The switch 1502 sets the target operation amount to the operation amount for the spark ignition combustion or the operation amount b for the HCCI combustion according to the value of the combustion mode switching flag. When the combustion mode switching flag is ON (=1), the operation amount b for the HCCI combustion is set as the target operation amount so as to perform the HCCI combustion. When the combustion mode switching flag is OFF (=0), the operation amount for the spark ignition combustion is set as the target operation amount so as to continue the spark ignition combustion.

Figure 16:
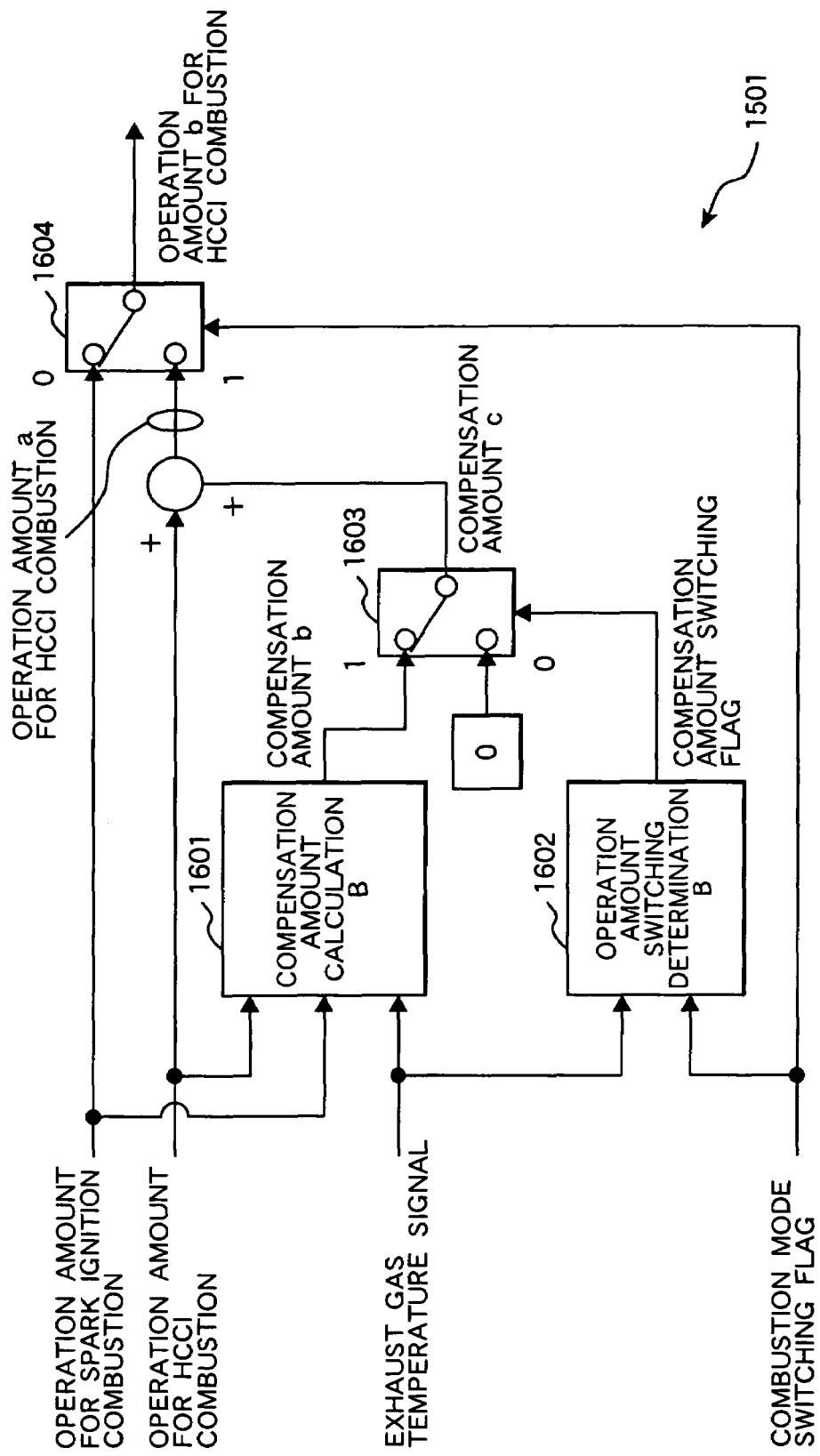
FIG. 16 is a control block diagram showing a combustion mode switching operation amount compensation B of FIG. 15 in the second example.

FIG. 16 is a control block diagram of the operation amount compensation B1501. The operation amount compensation B1501 is constructed of a compensation amount calculation B1601, a compensation amount switching determination B 1602, a switch B1603, and a switch 1604. The compensation amount calculation B1601 computes the compensation amount b based on the operation amount for the spark ignition combustion, the operation amount for the HCCI combustion, and the exhaust gas temperature signal. More specifically, an engine model is provided for estimating the mass of internal EGR from each operation amount. In order to reduce an influence by a deviation between the exhaust gas temperatures in the combustion mode switching, a compensation amount for compensating the operation amount for the HCCI combustion to decrease the mass of internal EGR is computed from a difference between the mass of internal EGR estimated from the operation amount for the spark ignition combustion and the mass of internal EGR estimated from the operation amount for the HCCI combustion. Based on the variation of the exhaust gas temperature signal with the temperature, the compensation amount with the smallest absolute value is output as a compensation amount b. The compensation amount switching determination B1602 sets the compensation amount switching flag based on the exhaust gas temperature signal and the combustion mode switching flag. More specifically, when the exhaust gas temperature signal is equal to or more than a predetermined value and the combustion mode switching flag is ON (=1), the compensation of the operation amount is determined to be necessary so as to prevent the deterioration of the exhaust gas and the increase in vibration and noise while the HCCI combustion is performed, and the compensation amount switching flag is set to ON (=1). When the exhaust gas temperature signal is equal to or less than a predetermined value, the compensation of the operation amount is determined to be unnecessary, and the compensation amount switching flag is set to OFF (=0). Note that the predetermined value of the exhaust gas temperature is previously determined on each operational condition using the map based on the result of the engine test or simulation. The switch 1603 selects the compensation amount calculation b or 0 based on the compensation amount switching flag set by the compensation amount switching determination B1602 to set the selected one as the compensation amount c. When the compensation amount switching flag is ON (=1), the deterioration of the exhaust gas and the increase in vibration and noise can occur immediately after the combustion mode switching from the spark ignition combustion to the HCCI combustion. Since the operation amount needs to be corrected, the compensation amount b computed by the compensation amount calculation B1601 is set as the compensation amount c. When the compensation amount switching flag is OFF (=0), the compensation of the operation amount for the HCCI combustion is not necessary, and thus the compensation amount c is set to zero. The switch 1604 selects an operation amount a for the HCCI combustion, which is the result of addition of the compensation amount c to the operation amount for the spark ignition combustion or to the operation amount for the HCCI combustion. Then, the switch 1604 sets the selected operation amount a as the operation amount b for the HCCI combustion. When the combustion mode switching flag is ON (=1), the operation amount a for the HCCI combustion is set as the operation amount b for the HCCI combustion, and then the HCCI combustion is performed. When the combustion mode switching flag is OFF (=0), the operation amount b for the HCCI combustion is set to the operation amount for the spark ignition combustion so as to perform the spark ignition combustion.

By the control described above, when performing the combustion mode switching from the spark ignition combustion to the HCCI combustion, in order to reduce the influence by the exhaust gas temperature in the HCCI combustion immediately after the combustion mode switching, each operation amount is corrected to decrease the inert EGR amount. This can reduce the increase in exhaust gas temperature in the HCCI combustion immediately after the combustion mode switching, thereby enabling prevention of the deterioration of the exhaust gas with the increase in mass of NOx emission, and the increase in vibration and noise with the increase in pressure rise rate.

Figure 17:
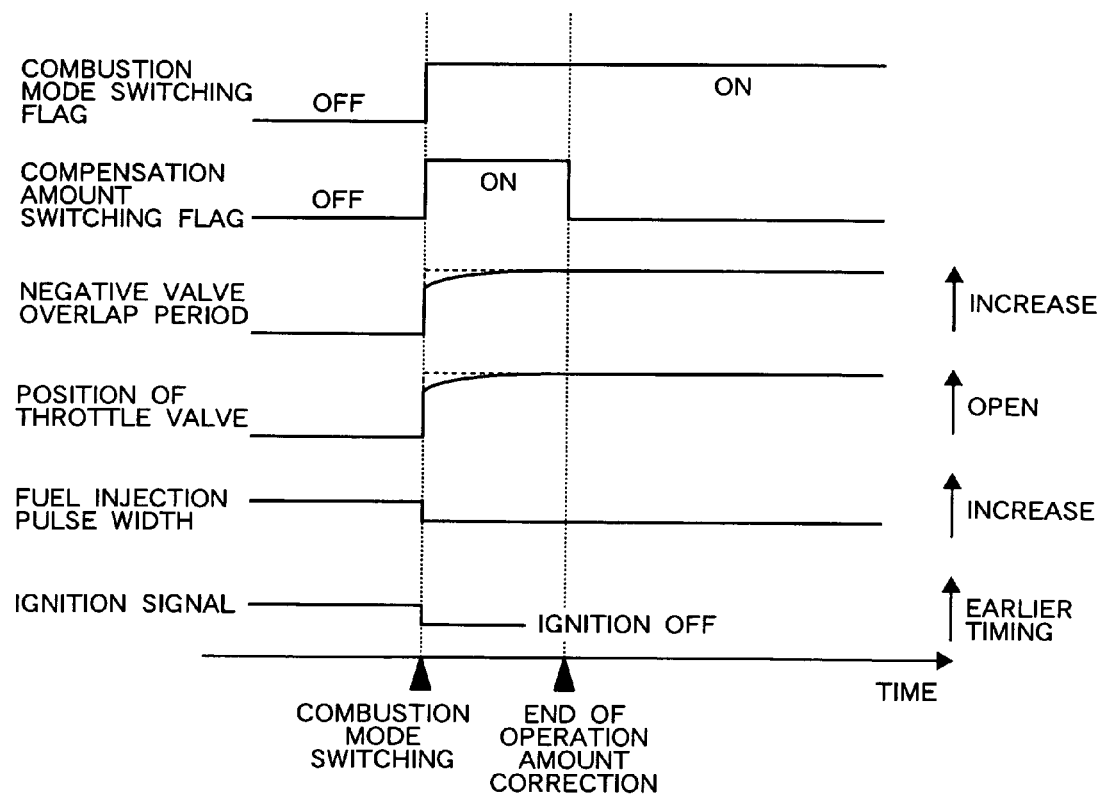
FIG. 17 is a chart diagram of a combustion mode switching flag, a compensation amount switching flag, a negative valve overlap period, a position of a throttle valve, a fuel injection pulse width, and an ignition signal in performing the combustion mode switching in the second example.

FIG. 17 shows an example of control of the combustion mode switching from the spark ignition combustion to the HCCI combustion by the combustion mode switching controller 20A. FIG. 10 shows time series of respective target values of the following: a combustion mode switching flag, a compensation amount switching flag, a negative valve overlap period indicative of timing of the variable valve 5, a position of the throttle valve 2, a fuel injection pulse width of the injector 3, and timing of an ignition signal of the ignition plug 4 (which respectively represents the combustion mode switching flag ON, the compensation amount switching flag ON, increase in negative valve overlap period, in position of the throttle valve, in fuel injection pulse width, and quickening of ignition timing, towards the upper part of the figure). The broken line represents the case in which the related art is applied, and the solid line represents the case in which the present embodiment is applied.

In performing the combustion mode switching by applying the related art, the target value is switched from the set value of the operation amount for the spark ignition combustion to the set value of the operation amount for the HCCI combustion.

In the present control by the combustion mode switching controller 20A, first, when the combustion mode switching determination 701 determines that the HCCI combustion is practicable, it is estimated that the combustion switching flag is set to ON (=1), while the exhaust gas temperature becomes high, and thus the operation amount compensation flag is set to ON (=1). Thereafter, although not shown in FIG. 17, a compensation amount for compensating the operation amount for the HCCI combustion is computed based on the operation amount for the spark ignition combustion, the operation amount for the HCCI combustion, and the exhaust gas temperature signal. The compensation amount computed is added to each operation amount. Although the negative valve overlap period is increased (or the closing timing of the exhaust valve is quickened) in order to introduce the internal EGR for performing the HCCI combustion, the absolute value of the negative valve overlap period is decreased by compensation as compared with the related art combustion mode switching, so as to prevent the influence by the high exhaust gas temperature in the HCCI combustion. Although the position of the throttle valve is increased so as to increase the mass of air, the increased amount of the throttle opening is reduced by compensation so as not to change the mass of air due to the change in the mass of internal EGR with the operation of the negative valve overlap period. Taking into consideration the change in thermal efficiency due to the change between the combustion modes, the fuel combustion pulse width is decreased so as to achieve the combustion mode switching at equal engine torque. The above-mentioned compensation amount which is added to the negative valve overlap period or the position of the throttle valve is computed based on the mass of internal EGR in the respective combustion modes which are estimated based on the operation amount for the spark ignition combustion and the operation amount for the HCCI combustion for the following purpose. That is, the compensation amount is computed to prevent the quickening of the ignition timing which may occur due to the presence of a deviation between the exhaust temperatures of the two combustion modes.

The operation amount immediately after the above-mentioned combustion mode switching is corrected, and thereafter the exhaust gas temperature is monitored by the exhaust gas temperature sensor 11. Depending on the decrease in the exhaust gas temperature after the switching of the combustion mode, the absolute value of each compensation amount is reduced. When the exhaust gas temperature signal is equal to or less than the predetermined value, an operation amount compensation flag is set to OFF (=0). Then, each compensation amount is turned to zero, which terminates the operation amount compensation. Thus, the HCCI combustion is performed using the operation amount for the HCCI combustion previously set in the map. Note that although the ON interval for the ignition signal is provided taking misfire into consideration, the ignition signal is cut so as to decrease the power energy after a predetermined time period.

By the above-mentioned combustion mode switching controller 20A, the combustion mode switching is performed from the spark ignition combustion to the HCCI combustion, while preventing the deterioration of the exhaust gas and the increase in vibration and noise.

Figure 18:
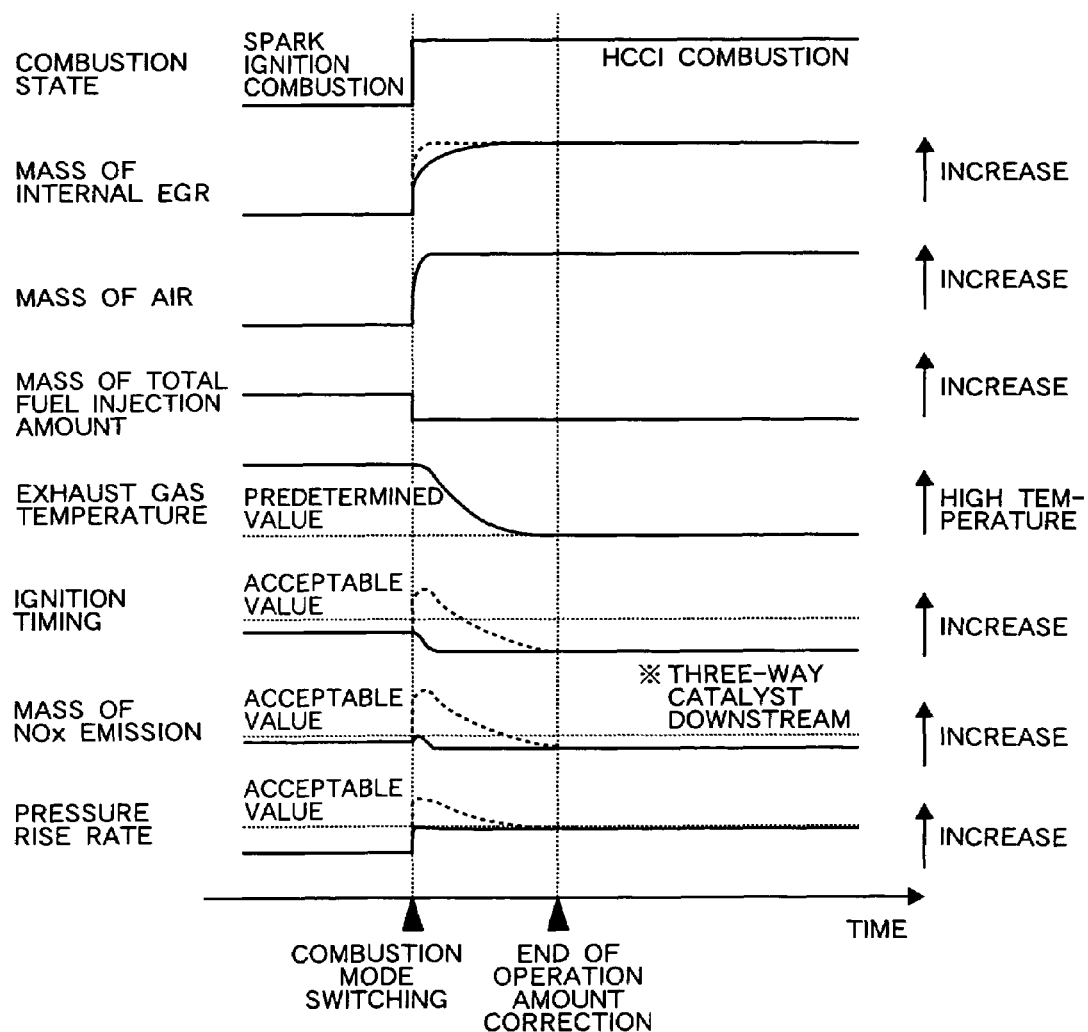
FIG. 18 is a chart diagram of combustion states, a negative valve overlap period, an exhaust gas temperature, ignition timing, a mass of NOx emission, and a pressure rise rate in performing the combustion mode switching in the second example.

FIG. 18 shows time series of combustion states, a mass of internal EGR, a mass of air, and a mass of total fuel injection in the cylinder 7, an exhaust gas temperature detected by the exhaust gas temperature sensor 11, ignition timing of the air-fuel mixture in the cylinder 7, a mass of NOx emission discharged from the variable valve 5, and a pressure rise rate in the cylinder 7 when performing the present control by the combustion mode switching controller 20A (which represents increase in mass of internal EGR, in mass of air, in fuel injection amount, and in exhaust gas temperature, quickening of ignition timing, and increase in mass of NOx emission and in pressure rise rate, towards the upper part of the figure).

The broken line represents the case in which the related art is applied, and the solid line represents the case in which the present embodiment is applied.

In the combustion mode switching in the related art, only the operation amount is changed according to the combustion state. Since the exhaust temperature immediately after the combustion mode switching becomes high, the ignition timing of the HCCI combustion is quickened to or more than an acceptable level. This results in the increase in the mass of NOx emission and pressure rise rate, which exceed the respective acceptable values, thus leading to the deterioration of the exhaust gas and the increase in vibration and noise.

In the present control by the combustion mode switching controller 20A, while the exhaust gas temperature becomes equal to or higher than a predetermined value after the combustion mode switching flag is turned to ON (=1), the compensation of the operation amount is determined to be necessary. Then, the operation amount compensation flag is set to ON (=1), and the operation amount in the HCCI combustion is corrected. More specifically, in order to perform the HCCI combustion, the negative valve overlap period is increased (or the valve closing timing is quickened) to decrease the mass of internal EGR. However, in order to reduce the influence of the high exhaust gas temperature immediately after the combustion mode switching, the compensation amount is added, so that the increased amount of the negative valve overlap period is small as compared with the case where the related art is applied, resulting in a smaller increased amount of the mass of internal EGR than the case of the related art. The mass of air is not changed so as to adjust a position of the throttle valve for the purpose of preventing variations in mass of air according to the change in mass of internal EGR. Furthermore, the fuel injection pulse width is decreased to decrease the mass of total fuel injection.

Since the absolute values of these corrected operation amounts vary based on the exhaust gas temperature signal, the mass of internal EGR is changed according to the change in exhaust gas temperature signal. More specifically, the exhaust gas temperature signal is monitored by the exhaust gas temperature sensor 11. When the exhaust gas temperature signal is equal to or less than a predetermined value, the operation amount switching flag is set to OFF (=0), and the compensation amount is set to zero. Thus, when the exhaust gas temperature is equal to or less than the predetermined value, the mass of internal EGR is the same as a mass of internal EGR in performing the HCCI combustion with the operation amount for the HCCI combustion.

Adjustment of the mass of internal EGR according to the change in exhaust gas temperature after the combustion mode switching prevents the quickening of the ignition timing. This can adjust the ignition timing based on the exhaust gas temperature by changing the absolute value of the compensation amount while the operation amount compensation flag is set to ON (=1). Immediately after the combustion mode switching flag is set to ON (=1), the ignition timing can be the same as that of the normal HCCI combustion, thereby preventing the increase in mass of NOx emission and pressure rise rate. This can perform the combustion mode switching, while preventing the deterioration of the exhaust gas and the increase in vibration and noise.

Figure 19:
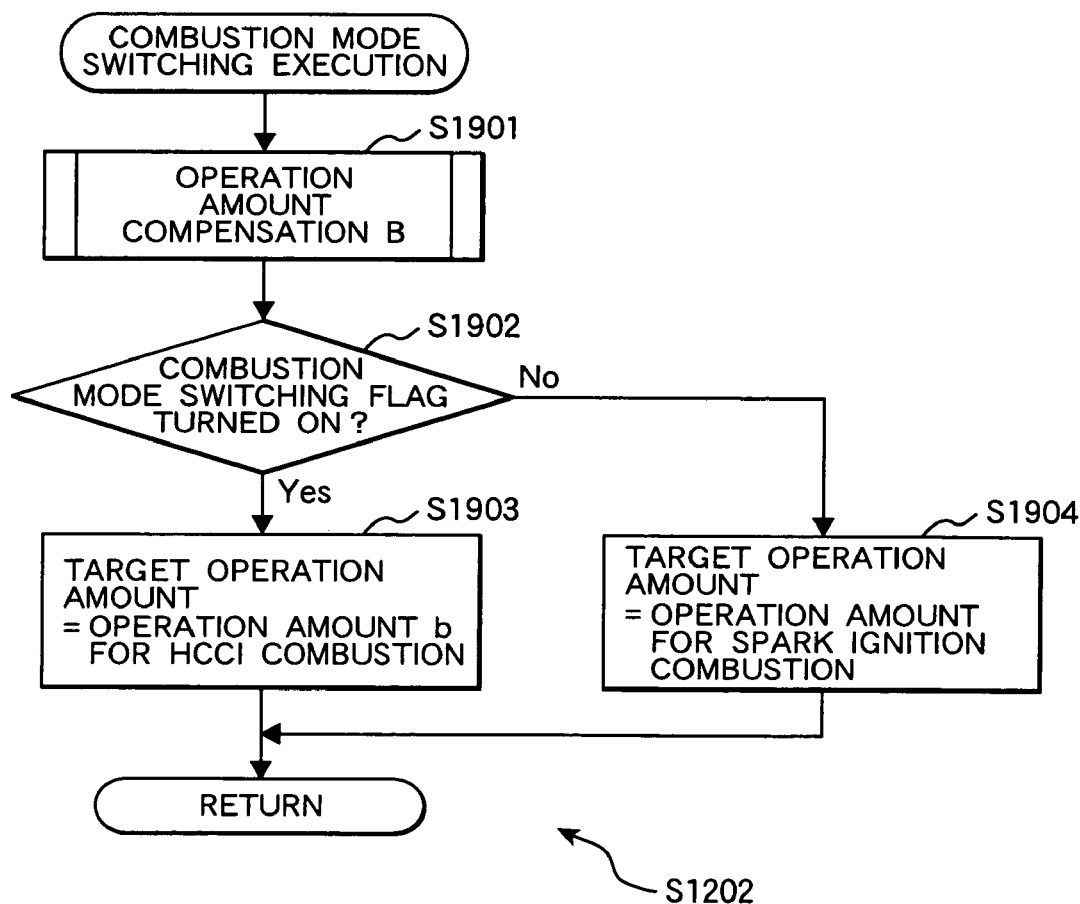
FIG. 19 is an operational flowchart showing a combustion mode switching execution of FIG. 12 in the second example.
Figure 20:
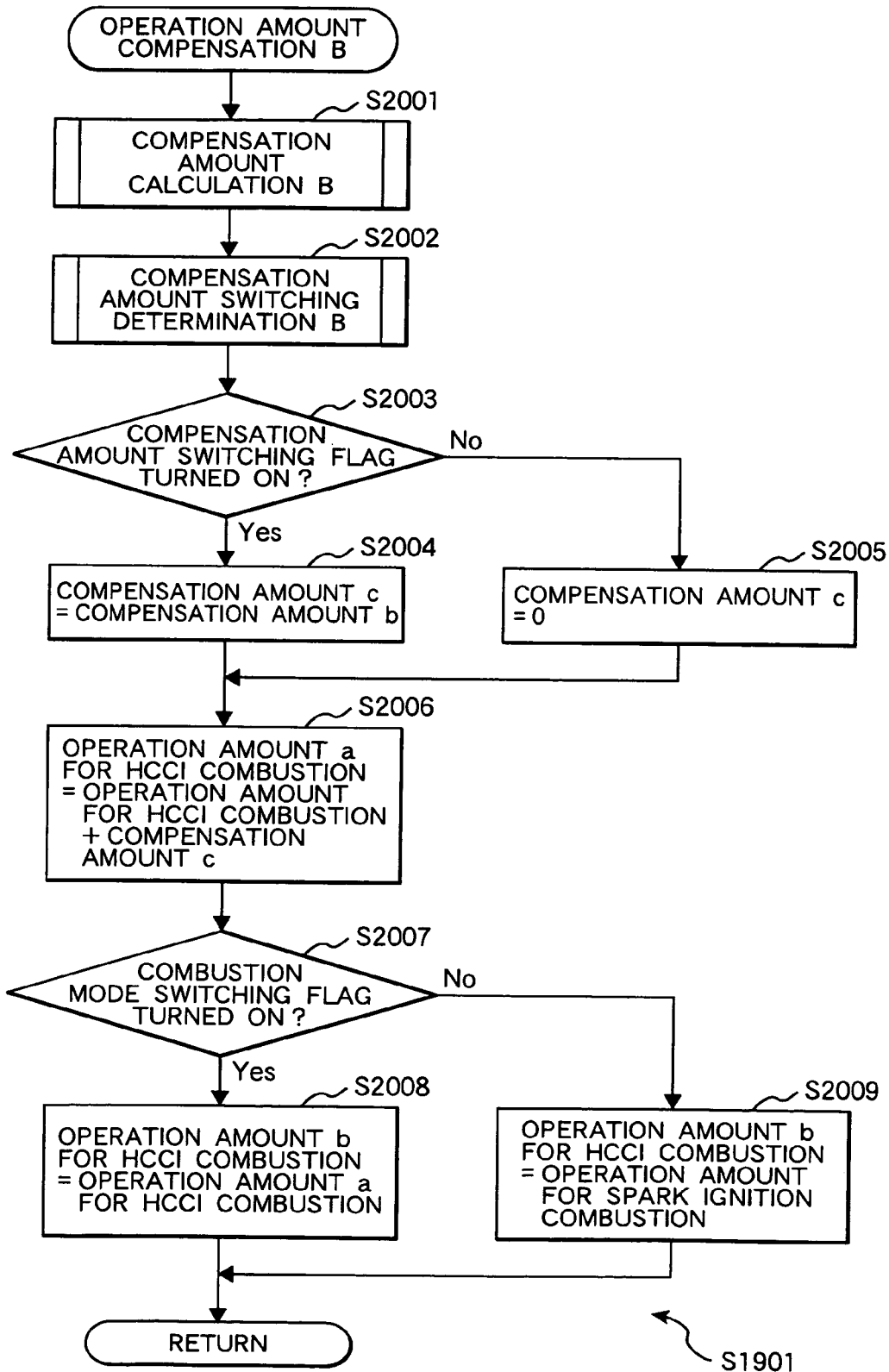
FIG. 20 is an operational flowchart showing an operation amount compensation A of FIG. 19 in the second example.

FIGS. 19 and 20 are operational flowcharts of the combustion mode switching control by the combustion mode switching controller 20A. The operational flowchart of a control block of the entire combustion mode switching controller 20A is the same as that of the first example, and shown in FIG. 12. In step S1201, the practical combustion state is determined based on the operation state (engine load, engine speed, or the like) according to the map shown in FIG. 1. When the HCCI combustion is practical, the combustion mode switching flag is set to ON (=1), and then the operation proceeds to step S1202. When the HCCI combustion is not practicable, the combustion mode switching flag is turned OFF (=0), and then the operation proceeds to step S1202. In step S1202, the combustion mode switching is carried out according to the combustion mode switching flag, which terminates a series of operations.

The control block diagram of FIG. 19 shows an operational flowchart of the combustion mode switching execution 1202 shown in FIG. 12. In step S1901, a compensation amount for the operation amount of the HCCI combustion in performing the combustion mode switching is computed, and then the operation proceeds to step S1902. In step S1902, it is determined whether the combustion mode switching flag is ON (=1) or not. When the combustion mode switching flag is ON (=1), the operation proceeds to step S1903. When the combustion mode switching flag is OFF (=0), the operation proceeds to step S1904. In step S1903, the operation amount b for the HCCI combustion computed in the operation amount compensation B S1901 is set as the target operation amount so as to perform the HCCI combustion, and is output to each actuator, which thereafter terminates a series of operations. In step S1904, since the combustion mode switching flag is OFF (=0), the operation amount for the spark ignition combustion is set as the target operation amount so as to perform the spark ignition combustion, and output to each actuator, which thereafter terminates a series of operations.

FIG. 20 is an operational flowchart of the operation amount compensation B S1901. In a compensation amount calculation B S2001, the compensation amount of the operation amount for the HCCI combustion is computed, and the operation proceeds to step S2002. More specifically, based on a deviation between the mass of internal EGR estimated from the operation amount for the spark ignition combustion and the mass of internal EGR estimated from the operation amount for the HCCI combustion, the compensation amount calculation B S2001 computes the compensation amount for each operation amount. The compensation amount is designed to decrease the mass of internal EGR so as to prevent the exhaust gas deterioration and the increase in vibration and noise which are affected by the deviation between the exhaust gas temperatures. Thereafter, based on the exhaust gas temperature signal, the absolute value of the compensation amount is changed. The compensation amount switching determination B S2002 sets a compensation amount switching flag based on the exhaust gas temperature signal and the combustion mode switching flag. More specifically, in a case where the combustion mode switching flag is ON (=1), when the exhaust gas temperature signal is equal to or more than a predetermined value, the compensation for decreasing the mass of internal EGR in the HCCI combustion is determined to be necessary. Then, the compensation amount switching flag is set to ON (=1), and the operation proceeds to step S2003. When the exhaust gas temperature signal is equal to or less than the predetermined value, the compensation for decreasing the mass of internal EGR in the HCCI combustion is determined to be unnecessary. Then, the compensation amount switching flag is set to OFF (=0), and the operation proceeds to step S2003. In step S2003, it is determined whether the compensation amount switching flag is ON (=1) or not. When the compensation amount switching flag is ON, the operation proceeds to step S2004. When the compensation amount switching flag is OFF (=0), the operation proceeds to step S2005. In step S2004, since the compensation of the operation amount for the HCCI combustion needs to be continued, the compensation amount b computed by the compensation amount calculation B S2001 is set as the compensation amount c, and then the operation proceeds to step S2006. In step S2004, since the compensation of the operation amount for the HCCI combustion is unnecessary, the compensation amount c is set to 0, and then the operation proceeds to step S2006. In step S2006, the compensation amount c is added to the operation amount for the HCCI combustion. The thus-obtained amount is set as the operation amount a for the HCCI combustion, and then the operation proceeds to step S2007. In step S2007, it is determined whether or not the combustion mode switching flag is ON (=1). When the combustion mode switching flag is ON (=1), the operation proceeds to step S2008 so as to perform the HCCI combustion. In contrast, when the combustion mode switching flag is OFF (=0), the operation proceeds to step S2009 so as to perform the spark ignition combustion. In step S2008, the operation amount a for the HCCI combustion is set as the operation amount b for the HCCI combustion so as to perform the spark ignition combustion, which terminates a series of operations. In step S2009, the operation amount for the spark ignition combustion is set as the operation amount b for the HCCI combustion so as to perform the spark ignition combustion, which terminates a series of operations.

By the present control performed by the combustion mode switching controller 20A which has been explained in the above-mentioned second example, the combustion mode switching is practicable from the spark ignition combustion to the HCCI combustion, while preventing the deterioration of the exhaust gas accompanied by the increase in mass of NOx emission, and the increase in vibration and noise accompanied by the increase in pressure rise rate.

When the combustion mode switching is performed by the combustion mode switching controller 20A in the above-mentioned example, the deterioration of the exhaust gas and the increase in vibration and noise can be prevented in the combustion mode switching. However, in some cases, the increase in mass of NOx emission cannot be prevented completely.

Figure 21:
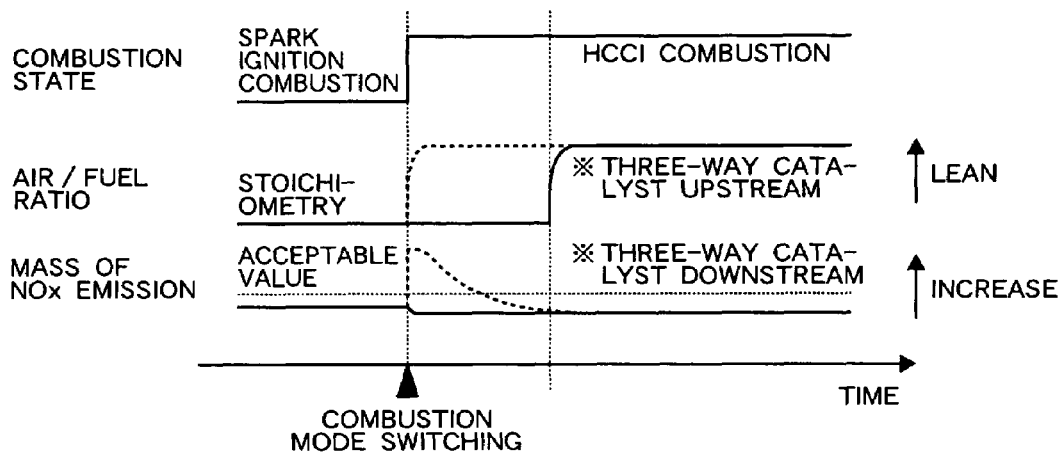
FIG. 21 is a chart diagram of combustion states, an air/fuel ratio upstream of the three-way catalyst 10, and a mass of NOx emission downstream of the three-way catalyst 10, in performing the combustion mode switching in the second example.

FIG. 21 shows time series of combustion states, an air/fuel ratio upstream of the three-way catalyst 10, and a mass of NOx emission downstream of the three-way catalyst 10 when performing the combustion mode switching by the combustion mode switching controller 20A of the invention. The broken line represents the case in which the combustion mode switching according to the invention is applied, and the solid line represents the case in which means for reducing the mass of NOx emission is applied.

In performing the combustion mode switching of the invention, the air/fuel ratio is changed together with the combustion mode switching. At this time, in an engine with a plurality of cylinders upstream of the three-way catalyst 10, the mass of NOx emission changes transiently only for a time corresponding to the number of cylinders. When the air/fuel ratio is changed from stoichiometry at the same time as the combustion mode switching, there poses a problem that the NOx in the transient state cannot be purified with the three-way catalyst, leading to a temporary increase in mass of NOx emission in the combustion mode switching.

Figure 22:
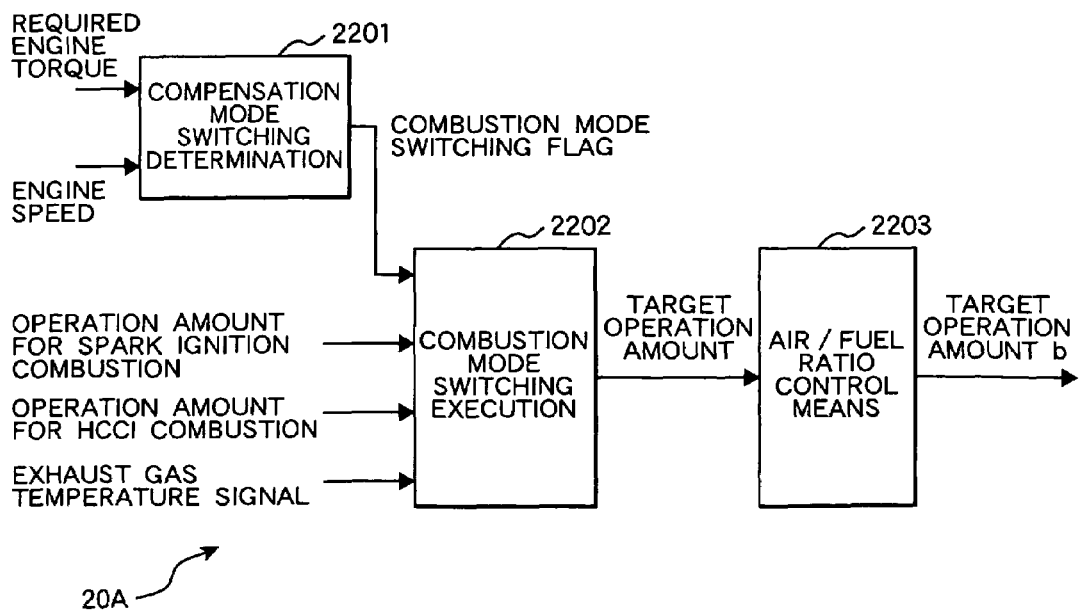
FIG. 22 is a control block diagram showing the combustion mode switching controller 20A including air/fuel ratio control means in the second example.

To solve this problem, air/fuel ratio switching control means 2203 for holding the air/fuel ratio immediately after the combustion mode switching in the stoichiometric state (see FIG. 22) is provided in the combustion mode switching controller with respect to the embodiments of the examples described above. Thus, as indicated by the solid line of FIG. 21, the air/fuel ratio can be maintained to the stoichiometry in a predetermined time interval in the HCCI combustion after the combustion mode switching, thereby preventing the increase in the mass of NOx emission in the combustion mode switching. The mass of NOx emission prevention means is not limited thereto. Since the three-way catalyst 10 has a function of storing oxygen therein, in even any change in air/fuel ratio, the purification effect can be maintained. Thus, this means may be one for determining the air/fuel ratio in the combustion mode switching based on the state of the three-way catalyst 10 estimated by the air/fuel ratio sensor 9 or an oxygen sensor not shown in FIG. 3.

Although the preferred embodiment of the invention has been described above, the invention is not limited thereto, and various modifications can be made to designs without departing from the spirit of the invention described in the appended claims.

For example, in the examples described above, means for reducing the influence due to the high exhaust gas temperature after the switching to the HCCI combustion is the delay of the ignition timing by decreasing the mass of internal EGR in the cylinder in the HCCI combustion. Although not shown in FIG. 3, another means may be means for directly decreasing the exhaust gas temperature by use of a water jet device for directly injecting water into the cylinder. Alternatively, further means may be the delay of the ignition timing by performing water injection during the negative valve overlap period and by directly decreasing the exhaust gas temperature immediately after the combustion mode switching.

In the above-mentioned example, as means for introduction of the EGR, is proposed control of the negative valve overlap period or the timing of closing the exhaust pipe, but the means may not be limited thereto. The valve timing of the variable valve 5 may be controlled so that the exhaust valve is opened during the intake stroke in which the intake valve is opened to allow the EGR to come into the cylinder. In this case, the adjustment of the opening and closing timing of the exhaust valve in the intake stroke decreases the EGR amount in the cylinder in the combustion mode switching.

In the examples described above, as the means for achieving the HCCI combustion, is applied means for adjusting the internal EGR during the negative valve overlap period in which the valve timing is adjusted, and igniting the air-fuel mixture in the cylinder. When there is provided means for causing the HCCI combustion using the exhausted gas by means of an external EGR pipe adapted to directly introduce the exhaust gas from the exhaust pipe 8 to the intake pipe 6 not shown in FIG. 3, another means for increasing the in-cylinder temperature so as to achieve the HCCI combustion may be the following. That is, this means may involve adjusting the external EGR amount to be introduced into the cylinder, thereby decreasing the exhaust gas temperature in the spark ignition combustion. Furthermore, not only the introduction of the external EGR, but also the water injection or the like may be applied to provide means for decreasing the exhaust gas temperature in the spark ignition combustion.

Although in the examples described above, the means for estimating the EGR amount is adapted to estimate the EGR amount from the operation amount for performing each combustion mode based on the engine model, the mass of internal EGR estimating means is not limited thereto. Although not shown in FIG. 3, there may be provided means for estimating the EGR temperature using an output signal from a sensor, such as an in-cylinder pressure sensor for directly measuring the change in the in-cylinder pressure, or an ion current sensor for directly measuring the change in ions in combustion. This means may compute a compensation amount for reducing the influence due to the increase in exhaust gas temperature in combustion mode switching.

Although in the above-mentioned examples, the means for estimating the exhaust gas temperature is the use of the exhaust gas temperature signal which is an output of the exhaust gas temperature sensor, the exhaust-gas-temperature estimating means is not limited thereto. Although not shown in FIG. 3, there may be provided another means for estimating the exhaust gas temperature using an output signal from a sensor, such as the in-cylinder pressure sensor for directly measuring a change in in-cylinder pressure, the ion current sensor for directly measuring a change in ions in combustion, and a water temperature sensor. This means may estimate a change in exhaust gas temperature in the combustion mode switching.

Furthermore, in the embodiment of the second example, the negative valve overlap period is decreased (or the closing timing of the exhaust valve is delayed) to decrease the mass of internal EGR, thereby reducing the influence due to the increase in the exhaust gas temperature. Together with this means, there may be provided means for delaying fuel injection timing of auxiliary fuel injection to reduce an amount of modification to the fuel during the negative valve overlap period, and for delaying the ignition timing so as to reduce the influence due to the high exhaust gas temperature. Furthermore, means for delaying the ignition timing may be provided which involves decreasing the rate of the auxiliary fuel injection amount to the total injection amount to decrease the auxiliary fuel injection amount.

The embodiment of the second example employs the combustion mode switching means for delaying the ignition timing by compensating the operation amount in the HCCI combustion after the combustion mode switching, but the invention is not limited thereto. The same combustion mode switching means as that in the first example may be provided for decreasing the exhaust gas temperature in the spark ignition combustion just before the combustion mode switching. In addition, the exhaust temperature in the spark ignition combustion just before the switching may be decreased, and then the combustion mode switching may be performed. And, the ignition timing in the HCCI combustion after the combustion mode switching may be delayed to perform the combustion mode switching.

What is claimed is:

1. A controller for an internal combustion engine for performing spark ignition combustion and EGR, and for performing combustion mode switching between the spark ignition combustion and HCCI combustion, the controller comprising:
when the combustion mode switching is performed from the spark ignition combustion to the HCCI combustion,
first combustion mode switching means for decreasing a temperature of exhaust gas in the spark ignition combustion before the combustion mode switching to perform the combustion mode switching, or
second combustion mode switching means for decreasing the EGR in the HCCI combustion immediately after the combustion mode switching to perform the combustion mode switching.

2. The controller for an internal combustion engine according to claim 1, further comprising exhaust gas temperature detection means for directly or indirectly detecting the exhaust gas temperature, wherein decreasing the exhaust gas temperature in the spark ignition combustion involves decreasing the exhaust gas temperature based on an exhaust gas temperature Ta detected or estimated by said exhaust gas temperature detection means.

3. The controller for an internal combustion engine according to claim 1, wherein said first combustion mode switching means increases a rate of the EGR in a combustion chamber of the internal combustion engine to decrease the exhaust gas temperature.

4. The controller for an internal combustion engine according to claim 1, wherein said first combustion mode switching means quickens closing timing of an exhaust valve to increase the EGR.

5. The controller for an internal combustion engine according to claim 1, wherein said first combustion mode switching means opens the exhaust valve in an intake stroke to increase the EGR.

6. The controller for an internal combustion engine according to claim 1, wherein said first combustion mode switching means increases the EGR using a device for recirculating the exhaust gas from a downstream side of an exhaust outlet to an upstream side of an intake inlet.

7. The controller for an internal combustion engine according to claim 1, wherein said first combustion mode switching means decreases a fuel injection amount, while quickening ignition timing to decrease the exhaust gas temperature.

8. The controller for an internal combustion engine according to claim 1, further comprising exhaust gas temperature detection means for directly or indirectly detecting the exhaust gas temperature, wherein decreasing the EGR amount in the HCCI combustion involves decreasing the EGR based on an exhaust gas temperature Tb detected or estimated by said exhaust gas temperature detection means.

9. The controller for an internal combustion engine according to claim 2, wherein said exhaust gas temperature detection means estimates the exhaust gas temperature based on an output signal from at least one of an exhaust gas temperature sensor, an in-cylinder pressure sensor, an ion current sensor, and a water temperature sensor.

10. The controller for an internal combustion engine according to claim 1, wherein said second combustion mode switching means delays the closing timing of the exhaust valve to decrease the EGR.

11. The controller for an internal combustion engine according to claim 1, wherein said second combustion mode switching means decreases the mass of total fuel injection in decreasing the EGR, and decreases a ratio of the fuel injection amount injected during a negative valve overlap period with an exhaust valve and an intake valve being closed in an exhaust stroke to the mass of total fuel injection.

12. The controller for an internal combustion engine according to claim 1, wherein said second combustion mode switching means delays timing of injecting the fuel during the negative valve overlap period in decreasing the EGR.

13. The controller for an internal combustion engine according to claim 1, wherein said first combustion mode switching means or said second combustion mode switching means includes EGR estimation means for directly or indirectly estimating the EGR, and is adapted to increase or decrease the EGR based on the estimated EGR.

14. The controller for an internal combustion engine according to claim 1, wherein said EGR estimation means estimates the EGR based on the closing timing of the exhaust valve or on the output signal from the in-cylinder pressure sensor or the ion current sensor.

15. The controller for an internal combustion engine according to claim 1, wherein said first combustion mode switching means or said second combustion mode switching means includes exhaust gas purification state estimation means for estimating a purified state of an exhaust gas purification device disposed downstream of the exhaust outlet, and is adapted to set an air/fuel ratio upstream of said exhaust gas purification device to a predetermined value in the combustion mode switching based on the estimated purified state by the exhaust gas purification state estimation means.

16. The controller for the internal combustion engine according to claim 1 wherein the engine is installed in a hybrid vehicle.

* * * * *